United States Patent
Ito et al.

(10) Patent No.: US 10,158,117 B2
(45) Date of Patent: Dec. 18, 2018

(54) TRANSITION METAL OXIDE CONTAINING SOLID-SOLUTION LITHIUM, AND NON-AQUEOUS ELECTROLYTE SECONDARY BATTERY USING TRANSITION METAL OXIDE CONTAINING SOLID-SOLUTION LITHIUM AS POSITIVE ELECTRODE

(71) Applicant: NISSAN MOTOR CO., LTD., Yokohama-shi, Kanagawa (JP)

(72) Inventors: Atsushi Ito, Yokosuka (JP); Shinji Yamamoto, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 14/908,032

(22) PCT Filed: Jul. 11, 2014

(86) PCT No.: PCT/JP2014/068608
§ 371 (c)(1),
(2) Date: Jan. 27, 2016

(87) PCT Pub. No.: WO2015/016046
PCT Pub. Date: Feb. 5, 2015

(65) Prior Publication Data
US 2016/0172675 A1 Jun. 16, 2016

(30) Foreign Application Priority Data
Jul. 31, 2013 (JP) .................. 2013-159505

(51) Int. Cl.
*H01M 4/505* (2010.01)
*H01M 4/525* (2010.01)
(Continued)

(52) U.S. Cl.
CPC ........ *H01M 4/505* (2013.01); *C01G 45/1242* (2013.01); *C01G 45/1257* (2013.01);
(Continued)

(58) Field of Classification Search
None
See application file for complete search history.

(56) References Cited

U.S. PATENT DOCUMENTS

| | | |
|---|---|---|
| 2003/0108793 A1 | 6/2003 | Dahn et al. |
| 2006/0159994 A1 | 7/2006 | Dahn et al. |

(Continued)

FOREIGN PATENT DOCUMENTS

| | | | |
|---|---|---|---|
| JP | 2004-538610 A | | 12/2004 |
| JP | 2005235628 A | * | 9/2005 |

(Continued)

OTHER PUBLICATIONS

Noguchi et al. JP 2005-235628 A, machine translation (Sep. 2005).*

(Continued)

*Primary Examiner* — Wojciech Haske
(74) *Attorney, Agent, or Firm* — Young Basile Hanlon & MacFarlane, P.C.

(57) ABSTRACT

A transition metal oxide containing solid-solution lithium that realizes high initial discharge capacity and capacity retention is represented by the compositional formula: $Li_{1.5}[Ni_aM_bMn_c[Li]_d]O_3$, wherein M represents at least one kind of element selected from the group consisting of silicon, phosphorus and metal elements (excluding Ni, Mn and Li), a, b, c and d satisfy specific relationships, and n is the valence of M. The oxide has a layered structure site and a site which changes to a spinel structure by performing a charge or a charge-discharge in a predetermined electric potential range, and a spinel structure change ratio k in a range of $0.25 \le k < 1.0$ when the spinel structure change ratio (Continued)

is assumed to be 1 in a case where $Li_2MnO_3$ of the layered structure in the transition metal oxide containing solid-solution lithium completely changes to $LiMn_2O_4$ of the spinel structure.

6 Claims, 5 Drawing Sheets

(51) Int. Cl.
*H01M 10/052* (2010.01)
*C01G 45/12* (2006.01)
*C01G 53/00* (2006.01)
*H01M 4/36* (2006.01)
*H01M 4/02* (2006.01)

(52) U.S. Cl.
CPC ............ *C01G 53/50* (2013.01); *C01G 53/54* (2013.01); *C01G 53/56* (2013.01); *H01M 4/366* (2013.01); *H01M 4/525* (2013.01); *H01M 10/052* (2013.01); *C01P 2002/20* (2013.01); *C01P 2002/32* (2013.01); *C01P 2006/40* (2013.01); *H01M 2004/028* (2013.01); *H01M 2220/20* (2013.01); *Y02T 10/7011* (2013.01)

(56) References Cited

U.S. PATENT DOCUMENTS

| | | | |
|---|---|---|---|
| 2011/0076564 A1* | 3/2011 | Yu | H01M 4/131 |
| | | | 429/231.1 |
| 2012/0228544 A1* | 9/2012 | Ito | H01M 4/505 |
| | | | 252/182.1 |
| 2013/0017449 A1 | 1/2013 | Yasuda et al. | |
| 2013/0337332 A1 | 12/2013 | Ito et al. | |
| 2014/0131633 A1 | 5/2014 | Ito et al. | |
| 2014/0356718 A1 | 12/2014 | Ito et al. | |

FOREIGN PATENT DOCUMENTS

| | | | | |
|---|---|---|---|---|
| JP | WO 2011068172 A1 * | 6/2011 | ............ | H01M 4/505 |
| JP | 2012-190580 A | 10/2012 | | |
| WO | 2011132369 A1 | 10/2011 | | |
| WO | 2013-005737 A1 | 1/2013 | | |
| WO | 2013-115390 A1 | 8/2013 | | |

OTHER PUBLICATIONS

Ceder et al. Electrochemical and Solid-State Letters, 2 (11) 550-552 (1999).*

Chiang, Yet-Ming et al., "Electrochemically Induced Cation Disorder and Phase Transformations in Lithium Intercalation Oxides", Chem. Mater, 2001, pp. 53-63, vol. 13, American Chemical Society.

Chiang, Yet-Ming et al., "High Capacity, Temperature-Stable Lithium Aluminum Manganese Oxide Cathodes for Rechargeable Batteries", Electrochemical and Solid-State Letters, 1999, pp. 107-110, vol. 2 (3), The Electrochemical Society, Inc.

Young-Il, Jang et al., "Electrochemical Cycling-Induced Spinel Formation in High-Charge-Capacity Orthorhombic LiMnO2", Journal of The Electrochecmical Society, 1999, pp. 3217-3223, vol. 146 (9), The Electrochemical Society, Inc.

* cited by examiner

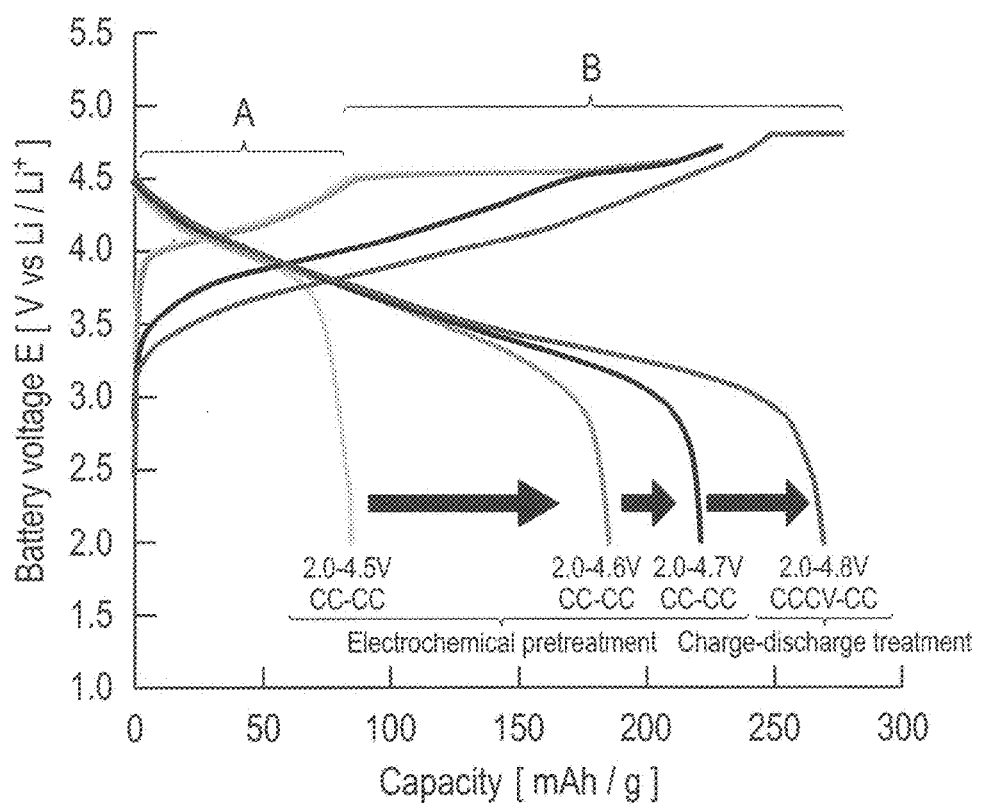

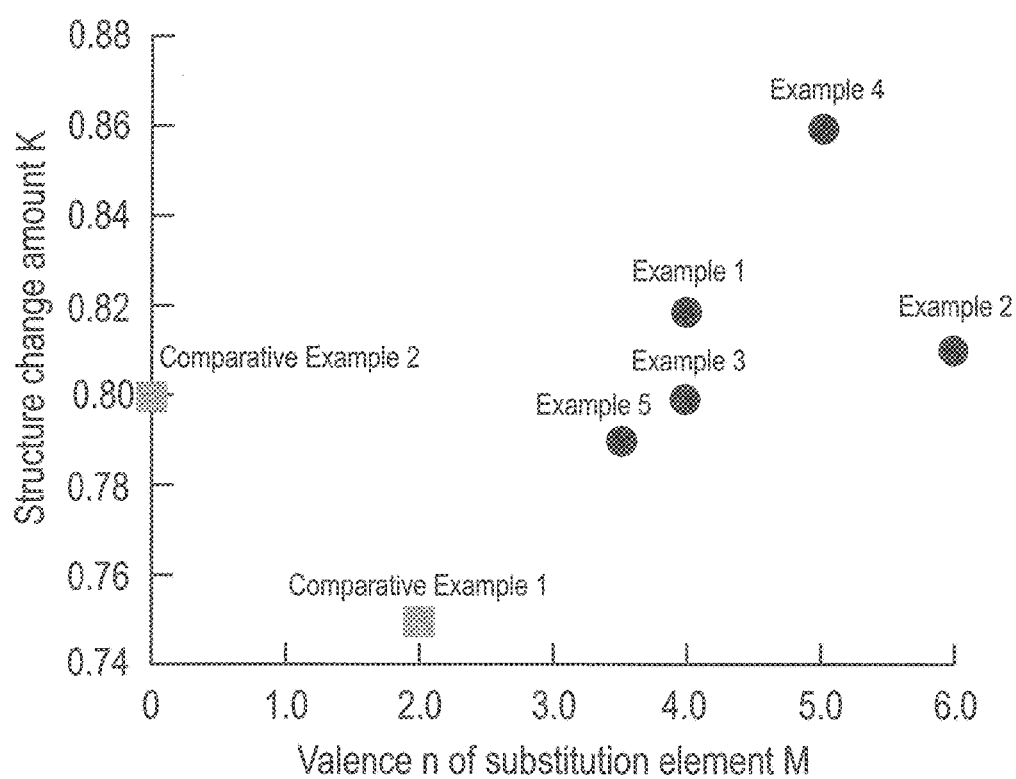

TRANSITION METAL OXIDE CONTAINING SOLID-SOLUTION LITHIUM, AND NON-AQUEOUS ELECTROLYTE SECONDARY BATTERY USING TRANSITION METAL OXIDE CONTAINING SOLID-SOLUTION LITHIUM AS POSITIVE ELECTRODE

CROSS REFERENCE TO RELATED APPLICATION

This application claims priority to Japanese Patent Application No. 2013-159505, filed on Jul. 31, 2013, herein incorporated by reference.

TECHNICAL FIELD

The present invention relates to a transition metal oxide containing solid-solution lithium, and a non-aqueous electrolyte secondary battery using the transition metal oxide containing solid-solution lithium as a positive electrode. More specifically, the non-aqueous electrolyte secondary battery of the present invention is used, for example, as driving power source or auxiliary power source for a motor in a vehicle such as an electric car, a fuel battery car and a hybrid electric car, or the like. In addition, the transition metal oxide containing solid-solution lithium of the present invention is used usually as a positive electrode active material of a lithium ion secondary battery.

BACKGROUND

In recent years, reduction of carbon dioxide emission amount is eagerly desired in order to cope with the atmospheric pollution and the global warming. In the car industry, reduction of carbon dioxide emission amount by introduction of an electric car (EV), a hybrid electric car (HEV) or the like draws attention, and development of an electrical device such as a secondary battery for driving a motor, which is a key to practical application of them, is actively carried out.

As a secondary battery for driving a motor, a lithium ion secondary battery having high theoretical energy attracts attention, and development thereof is currently underway rapidly. A lithium ion secondary battery is generally constituted such that a positive electrode formed by applying a slurry for positive electrode containing a positive electrode active material onto the surface of a current collector, a negative electrode formed by applying a slurry for negative electrode containing a negative electrode active material onto the surface of a negative electrode current collector, and an electrolyte located between them, are accommodated in a battery case.

Selection of each active material is very important in order to improve capacity property, output property, and the like of a lithium ion secondary battery.

In the past, a cathode composition for a lithium ion battery having a formula (a) $Li_y[M^1_{(1-b)}Mn_b]O_2$ or (b) $Li_x[M^1_{(1-b)}Mn_b]O_{1.5+c}$ (in the formula, $0 \leq y < 1$, $0 < b < 1$, and $0 < c < 0.5$, and $M^1$ represents one or more metal elements; however, in the case of (a), $M^1$ is a metal element except for chromium), was suggested, wherein the cathode composition for a lithium ion battery is in a form of single phase having O3 crystal structure that does not cause phase transition to spinel crystal structure when the cathode composition for lithium ion battery is incorporated into a lithium ion battery, and cycle operations of 100 complete charge-discharge cycles are performed at 30° C. and 130 mAh/g of the final capacity using 30 mA/g of the discharge current (see Japanese Patent No. 2004-538610).

However, during investigation of the inventors, there has been a problem that the lithium ion battery using a cathode composition for a lithium ion battery described in Japanese Patent No. 2004-538610 cannot realize high discharge capacity and capacity retention rate.

SUMMARY

The present invention is made in consideration of the above-mentioned problem. An object of the invention is to provide a transition metal oxide containing solid-solution lithium, and a non-aqueous electrolyte secondary battery using the transition metal oxide containing solid-solution lithium as a positive electrode which can realize high initial discharge capacity and capacity retention rate.

The inventors studied extensively in order to achieve the object above. As a result thereof, the inventors found that the above-mentioned object can be achieved with a transition metal oxide containing solid-solution lithium represented by a specific compositional formula constituted such that the transition metal oxide containing solid-solution lithium has a layered structure site and a site which changes to a spinel structure by performing a charge or a charge-discharge in a predetermined electric potential range ($Li_2MnO_3$ of the layered structure), and a spinel structure change ratio k of the transition metal oxide containing solid-solution lithium is in a range of $0.25 \leq k < 1.0$ when the ratio is assumed to be 1 in a case where $Li_2MnO_3$ of the layered structure in the transition metal oxide containing solid-solution lithium changes to $LiMn_2O_4$ of the spinel structure, and the site changing to the spinel structure completely changes to $LiMn_2O_4$ of the spinel structure, and completed the present invention.

Specifically, the transition metal oxide containing solid-solution lithium of the present invention is represented by the compositional formula (1)

[Chemical Formula 1]

$$Li_{1.5}[Ni_aM_bMn_c[Li]_d]O_3 \qquad (1)$$

(in the formula (1), Li represents lithium, Ni represents nickel, M represents at least one kind of element selected from the group consisting of silicon, phosphorus and metal elements (but excluding Ni, Mn and Li), Mn represents manganese, and O represents oxygen, and a, b, c and d satisfy the relationships of $0 < a < 1.4$, $0 < b \leq 0.2$, $0 < c < 1.4$, $0.1 < d \leq 0.4$, $a+b+c+d=1.5$ and $1.1 \leq [a+b+c] < 1.4$, and n, which is the valence of M, is in a range of $3 \leq n \leq 6$ (when M consists of two or more elements, n is the average value of the valence of each element)).

The transition metal oxide containing solid-solution lithium of the present invention has a layered structure site and a site which changes to a spinel structure by performing a charge or a charge-discharge in a predetermined electric potential range.

In addition, in the transition metal oxide containing solid-solution lithium of the present invention, the spinel structure change ratio k of the transition metal oxide containing solid-solution lithium is in a range of $0.25 \leq k < 1.0$ when the spinel structure change ratio is assumed to be 1 in a case where $Li_2MnO_3$ of the layered structure in the transition metal oxide containing solid-solution lithium changes to $LiMn_2O_4$ of the spinel structure, and the site changing to the spinel structure completely changes to $LiMn_2O_4$ of the spinel structure.

In addition, the non-aqueous electrolyte secondary battery of the present invention uses the transition metal oxide containing solid-solution lithium of the present invention as a positive electrode.

BRIEF DESCRIPTION OF THE DRAWINGS

FIG. 1B is a graphical representation illustrating the real capacity of the plateau region used in the definition of the spinel structure change ratio k;

FIG. 5 is a graph illustrating the relationship of the valence of the substitution element M of the transition metal oxide containing solid-solution lithium and the spinel structure change ratio k.

DESCRIPTION OF THE EMBODIMENTS

Figure 1A:
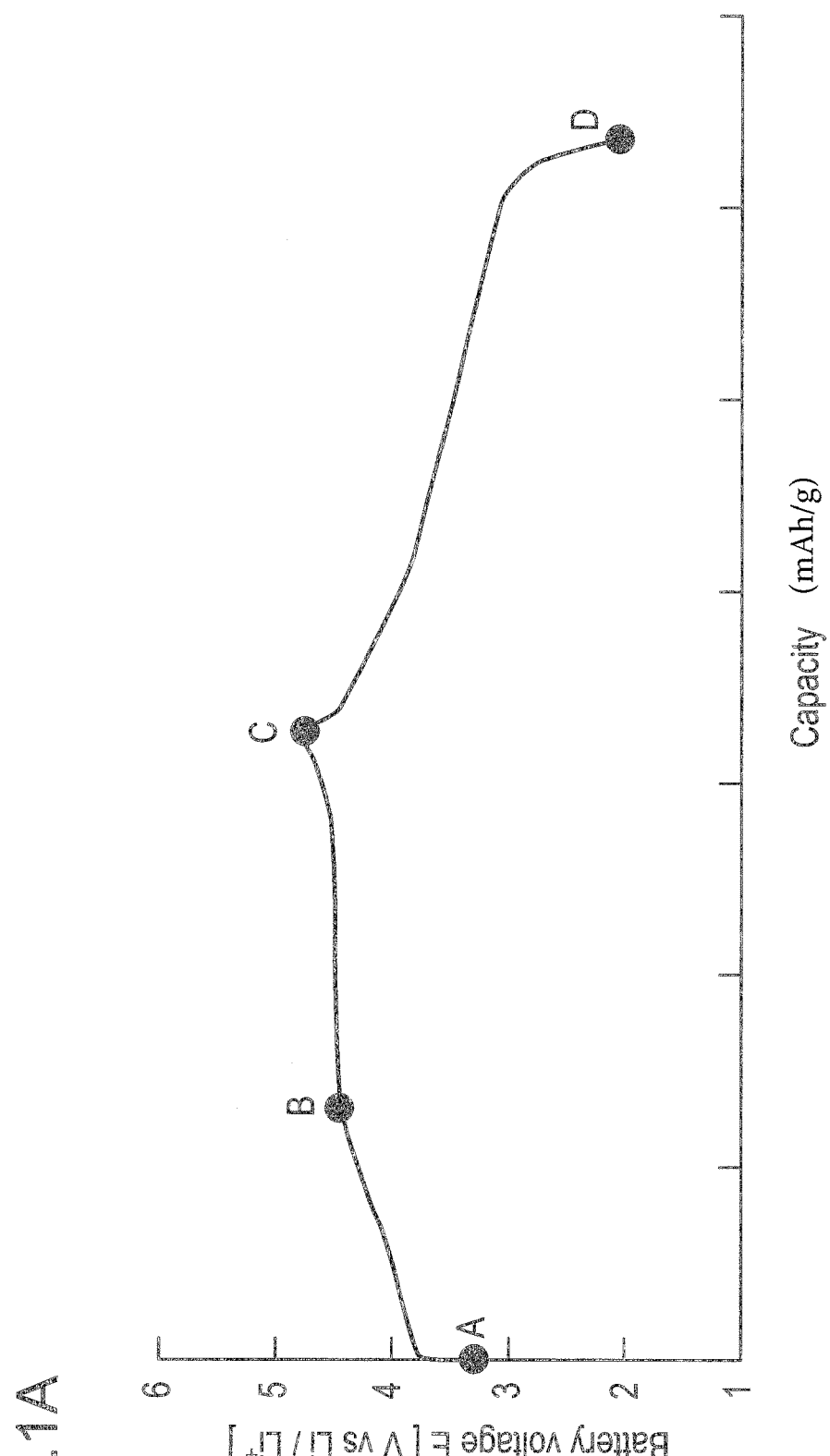
FIG. 1A is a graphical representation illustrating the definition of a spinel structure change ratio k.

Hereinafter, the transition metal oxide containing solid-solution lithium of the present invention, and a non-aqueous electrolyte secondary battery using the transition metal oxide containing solid-solution lithium as a positive electrode will be described in detail. In addition, the transition metal oxide containing solid-solution lithium of the present invention is suitably used as a positive electrode active material of a non-aqueous electrolyte secondary battery, for example, a lithium ion secondary battery. Accordingly, a positive electrode for the non-aqueous electrolyte secondary battery and a non-aqueous electrolyte secondary battery according to one embodiment of the present invention will be described with examples of a positive electrode for a lithium ion secondary battery and a lithium ion secondary battery, respectively.

First, the transition metal oxide containing solid-solution lithium according to one embodiment of the present invention will be described in detail.

The transition metal oxide containing solid-solution lithium of the present embodiment is represented by the compositional formula (1) described below.

[Chemical Formula 2]

$$Li_{1.5}[Ni_aM_bMn_c[Li]_d]O_3 \qquad (1)$$

In the formula (1), Li represents lithium, Ni represents nickel, M represents at least one kind of element selected from the group consisting of silicon, phosphorus and metal elements (but excluding Ni, Mn and Li), Mn represents manganese, and O represents oxygen. a, b, c and d satisfy the relationships of $0<a<1.4$, $0<b\leq0.2$, $0<c<1.4$, $0.1<d\leq0.4$, $a+b+c+d=1.5$, and $1.1\leq[a+b+c]<1.4$. n, which is the valence of M (when M consists of two or more elements, n is the average value of the valence of each element), is in a range of $3\leq n\leq6$.

Then, the transition metal oxide containing solid-solution lithium of the present embodiment has a layered structure site and a site which changes to a spinel structure ($Li_2MnO_3$ of the layered structure) by performing a charge or a charge-discharge in a predetermined electric potential range. Further, the spinel structure change ratio is assumed to be 1 in a case where $Li_2MnO_3$ of the layered structure in the transition metal oxide containing solid-solution lithium changes to $LiMn_2O_4$ of the spinel structure, and the site changing to the spinel structure completely changes to $LiMn_2O_4$ of the spinel structure. At this time, the spinel structure change ratio k of the transition metal oxide containing solid-solution lithium is in a range of $0.25\leq k<1.0$.

In this embodiment, by using the transition metal oxide containing solid-solution lithium constituted as described above, it is possible to provide a solid-solution positive electrode material that can realize high discharge capacity and capacity retention rate by high reversible capacity, and further can also realize high charge-discharge efficiency. It is believed that this is because increase of binding energy to oxygen, and increase of stability of the crystalline structure caused thereby are obtained by a polyvalent, different kind of element M replacing a portion of the transition metal oxide containing solid-solution lithium represented by the above compositional formula (a portion of Mn or Ni). As a result thereof, in the transition metal oxide containing solid-solution lithium that is substituted with a polyvalent, different kind of element M, the plateau capacity is usually generated at a potential of 4.5 V or higher (4.3 V or higher depending on the composition), and in accordance with that, change of the crystalline structure occurs. At this time of the change of the crystalline structure, structure destruction occurs easily at the same time, and increase of stability of the crystalline structure by the element substitution suppresses destruction of the crystalline structure at this time, and allows reversible deinsertion of more Li. Accordingly, it is possible to realize high discharge capacity and capacity retention rate (cycle property) by high reversible capacity and high charge-discharge efficiency.

Such transition metal oxide containing solid-solution lithium can realize high discharge capacity and capacity retention rate, and high charge-discharge efficiency when used as a positive electrode active material of a lithium ion secondary battery, and thus is suitable used in a positive electrode for a lithium ion secondary battery, or a lithium ion secondary battery. As a result thereof, the transition metal oxide containing solid-solution lithium can be used suitably as a lithium ion secondary battery for operating a power source or an auxiliary power source of a vehicle. In addition to this, the transition metal oxide containing solid-solution lithium can be sufficiently applied to a lithium ion secondary battery for household or a mobile device.

The polyvalent, different kind of element M in the formula (1) is at least one kind of element selected from the group consisting of silicon, phosphorus and metal elements (but excluding Ni, Mn and Li). For example, examples of the polyvalent, different kind of element M include copper (Cu), magnesium (Mg), zinc (Zn), lead (Pb), aluminum (Al), cobalt (Co), chromium (Cr), gallium (Ga), iron (Fe), samarium (Sm), silicon (Si), germanium (Ge), ruthenium (Ru), iridium (Ir), technetium (Tc), tin (Sn), zirconium (Zr), phosphorus (P), vanadium (V), niobium (Nb), tantalum (Ta), bismuth (Bi), molybdenum (Mo) and the like, but are not limited thereto.

Figure 3:
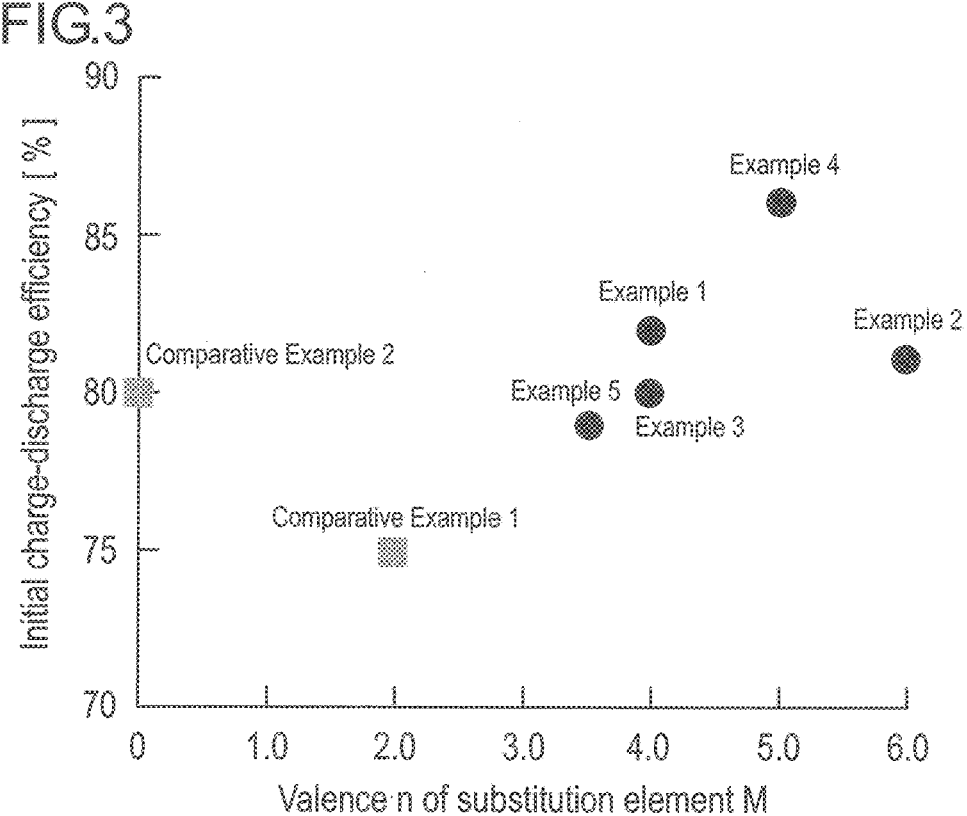
FIG. 3 is a graph illustrating the relationship of the valence of the substitution element M of the transition metal oxide containing solid-solution lithium and the charge-discharge efficiency.

In the formula (1), n, which is the valence of the polyvalent, different kind of element M (when M consists of two or more elements, n is the average value of the valence of each element), is preferably in a range of $4\leq n\leq6$, and more preferably $4\leq n\leq5$ (see FIGS. 3 and 5). The valence and the ion radius of the polyvalent, different kind of element M (Li, Ni and Mn are written together for reference) exemplified above are shown in Table 1 described below. Meanwhile, Cu, Ni, Mn, Nb, Mo and the like can have multiple valences, but if the crystalline structure thereof is stipulated as in the transition metal oxide containing solid-solution lithium of the present invention, the allowable valence under the atmosphere is uniquely decided (see Table 1 described below). Herein, the reason that the upper limit of n, which is the valence of M is set to 6, is that the maximum valence of the transition metal oxide containing solid-solution lithium of the present invention allowable in the crystalline structure is 6. On the other hand, the reason that n, which is the valence of M, is set to 3 or more, is that with the valence of less than 3, the effect of improving the initial properties is not sufficiently obtained. n, which is the valence of the polyvalent, different kind of element M is preferably 4≤n≤6, and more preferably 4≤n≤5, whereby the effect of improving the initial properties becomes remarkable, both of higher charge-discharge efficiency and discharge capacity can be obtained, and further higher capacity retention rate can be maintained.

TABLE 1

| Valence | Kind of element | Ion radius (Å) |
|---|---|---|
| 1 | Li | 0.76 |
| 2 | Cu | 0.73 |
|   | Ni | 0.69 |
|   | Mg | 0.72 |
|   | Zn | 0.74 |
|   | Pb | 1.19 |
| 3 | Al | 0.535 |
|   | Co | 0.545 |
|   | Cr | 0.615 |
|   | Ga | 0.62 |
|   | Fe | 0.645 |
|   | Sm | 0.958 |
| 4 | Si | 0.4 |
|   | Mn | 0.53 |
|   | Ge | 0.53 |
|   | Ru | 0.62 |
|   | Ir | 0.625 |
|   | Tc | 0.645 |
|   | Sn | 0.69 |
|   | Zr | 0.72 |
| 5 | P | 0.38 |
|   | V | 0.54 |
|   | Nb | 0.64 |
|   | Ta | 0.64 |
|   | Bi | 0.76 |
| 6 | Mo | 0.59 |

In the case where a, b, c and d in the formula (1) do not satisfy the relationships of 0<a<1.4, 0<b≤0.2, 0<c<1.4, 0.1<d≤0.4, a+b+c+d=1.5 and 1.1≤[a+b+c]<1.4, the structure in the solid-solution is not stabilized. In particular, in a case where the composition ratio b of the polyvalent, different kind of element (substitution element) M is 0, increase of binding energy to oxygen by the substitution element, and increase of stability of the crystalline structure caused thereby are not obtained. On the other hand, in a case where b exceeding 0.2 is added when a portion of the transition metal oxide containing solid-solution lithium is substituted with the polyvalent, different kind of element M, the impurity phase is produced, and thus it is not desirable in the context of realizing high discharge capacity and capacity retention rate by high reversible capacity and high charge-discharge efficiency as the battery performances.

Herein, the "spinel structure change ratio" in this invention prescribes the ratio of $Li_2MnO_3$ of the layered structure in the transition metal oxide containing solid-solution lithium changed to $LiMn_2O_4$ of the spinel structure by performing a charge or a charge-discharge in a predetermined electric potential range, and the spinel structure change ratio is assumed to be 1 in a case where $Li_2MnO_3$ of the layered structure in the transition metal oxide containing solid-solution lithium completely changes to $Li_2MnO_4$ of the spinel structure. Specifically, the spinel structure change ratio k is defined with the formula described below. In addition, FIG. 1A is a graphical representation illustrating the definition of the spinel structure change ratio k. FIG. 1B is a graphical representation illustrating the real capacity of the plateau region used in the definition of the spinel structure change ratio k. Specifically, FIG. 1B is a graphical representation illustrating that the real capacity of the plateau region used in calculation of the structure change ratio k is the capacity obtained by summing the plateau capacities generated near 4.5 V (4.3 V or higher) in a case where electrochemical pretreatment and charge-discharge treatment are performed (real capacity; the range of B in the figure).

$$\begin{pmatrix} \text{Spinel structure} \\ \text{change ratio } (K) \end{pmatrix} = \frac{(\text{Real capacity of plateau region})}{\begin{pmatrix} \text{Theoretical capacity } (Vs) \text{ due to} \\ \text{Li2MnO3 in solid-solution} \end{pmatrix} \times \begin{pmatrix} \text{Compositional ratio } (x) \text{ of} \\ \text{Li2MnO3 in solid-solution} \end{pmatrix}}$$ [Mathematical Formula 1]

The definition of the "spinel structure change ratio" is described with an example of the case shown in FIG. 1A where A is the initial state before charge initiation, B is the charge state of being charged to 4.5 V (starting point of the plateau region) from the initial state A, C is the overcharge state of being further charged to 4.8 V (end point of the plateau region) through the plateau region, and D is the discharge state of being further discharged to 2.0 V, with respect to a battery assembled using a positive electrode using the transition metal oxide containing solid-solution lithium as a positive electrode active material. The "real capacity of the plateau region" in the formula may be obtained by measuring the real capacity of the plateau region in FIG. 1A (specifically, the plateau region is the region from 4.5 V to 4.8 V (real capacity $V_{BC}$ of the region BC from the charge state B to the overcharge state C; the real capacity of the plateau region), and the region due to change of the crystal structure). Meanwhile, the starting point of the plateau region is usually 4.5 V, but depending on the polyvalent, different kind of element (substitution element) M of the transition metal oxide containing solid-solution lithium, the plateau region may begin from lower potential, specifically from the potential between 4.3 V and 4.5 V. Specifically, the potential at which the plateau capacity due to the structure change is generated, varies depending on the composition of the transition metal oxide containing solid-solution lithium.

In addition, in the transition metal oxide containing solid-solution lithium of the compositional formula (1), practically, the real capacity $V_{AB}$ of the region AB from the initial state A to the charge state B of being charged to 4.5 V (starting point of the plateau region) corresponds to the compositional ratio (y) and the theoretical capacity ($V_L$) of $LiM_1O_2$ that is the layered structure site, and the real capacity $V_{BC}$ of the region BC from the charge state B of being charged to 4.5 V (starting point of the plateau region) to the overcharge state C of being charged to 4.8 V (end point of the plateau region) corresponds to the compositional ratio (x) and theoretical capacity ($V_S$) of $Li_2MnO_3$ that is the spinel structure site. Thus, if the real capacity ($V_T$) measured from the initial state A to the predetermined plateau region is assumed to be ($V_T=V_{AB}+V_{BC}$), then $V_{AB}$=y ($V_L$) and $V_{BC}$=x ($V_S$), and accordingly, the spinel structure change ratio can be calculated using the formula described below. Herein, the $M^1$ represents at least one kind selected from the group consisting of nickel (Ni), the polyvalent, different kind of element M and manganese (Mn). The polyvalent, different kind of element M is at least one kind of element selected from the group consisting of silicon, phosphorus and metal elements (but excluding Ni, Mn and Li). Meanwhile, the reason that the state of being charged to 4.8 V (end point of the plateau region) is assumed to be the "overcharge state", is that the potential of 4.8 V is regarded overcharge state in a battery actually used (4.5 V is usually used as the upper limit voltage). Herein, in single evaluation of the active material (transition metal oxide containing solid-solution lithium) (particularly calculation of the spinel structure change ratio k and the like), the evaluation (calculation of the value k and the like) is performed at 4.8 V charge to ascertain the performance limit of the simple substance of the active material.

[Mathematical Formula 2]

$$\left(\begin{array}{c}\text{Spinel structure}\\\text{change ratio }(K)\end{array}\right) = \frac{\left(\begin{array}{c}\text{Real capacity }(V_T)\text{ measured}\\\text{to plateau region}\end{array}\right) - \left(\begin{array}{c}\text{Theoretical capacity }(V_L)\text{ due to}\\LiM^1O_2\text{ in solid-solution}\end{array}\right) \times \left(\begin{array}{c}\text{Compositional ratio }(y)\text{ of}\\LiM^1O_2\text{ in solid-solution}\end{array}\right)}{\left(\begin{array}{c}\text{Theoretical capacity }(V_s)\text{ due to}\\Li_2(MnO)_3\text{ in solid-solution}\end{array}\right) \times \left(\begin{array}{c}\text{Compositional ratio }(x)\text{ of}\\Li_2MnO_3\text{ in solid-solution}\end{array}\right)}$$

Further, the "compositional ratio of $Li_2MnO_3$ in the solid-solution" can be calculated from the compositional formula of the transition metal oxide containing solid-solution lithium. Meanwhile, the presence or absence of the layered structure site and the spinel structure site in the transition metal oxide containing solid-solution lithium can be decided by the presence of peaks special for the layered structure and the spinel structure by X ray diffraction analysis (XRD), and the ratios thereof can be decided from measurement and calculation of the capacity as described above.

In addition, there is no case where the spinel structure change ratio k is 1.0, and in a case where the spinel structure change ratio k is less than 0.25, sufficient battery performances are not obtained. Specifically, in the transition metal oxide containing solid-solution lithium that is substituted with the polyvalent, different kind of element M, usually the plateau capacity is generated at a potential of 4.5 V or higher (4.3 V or higher depending on the composition), and in accordance with that, change of the crystalline structure occurs. However, in a case where the structure change ratio k is small such as less than 0.25, increase of stability of the crystalline structure by the element substitution becomes insufficient, and suppression of crystalline structure destruction at this time is not sufficient, and reversible deinsertion of more Li becomes difficult. Accordingly, it is not possible to realize high discharge capacity and capacity retention rate by high reversible capacity, and high charge-discharge efficiency (cycle property), and obtain sufficient battery performance.

In addition, in the transition metal oxide containing solid-solution lithium of the present embodiment, a, b, c and d in the compositional formula (1) suitably satisfy the relationships of $0<a\leq1.35$, $0<b\leq0.1$, $0<c\leq1.35$, $0.15\leq d\leq0.35$, $a+b+c+d=1.5$ and $1.15\leq a+b+c\leq1.35$. Further, suitably, n, which is the valence of M is in a range of $4\leq n\leq6$, and the spinel structure change ratio k of the transition metal oxide containing solid-solution lithium is in a range of $0.5\leq k\leq0.9$.

Further, in the transition metal oxide containing solid-solution lithium of the present embodiment, a, b, c and d in the compositional formula (1) suitably satisfy the relationships of $0<a\leq1.3$, $0.01\leq b\leq0.05$, $0<c\leq1.3$, $0.15\leq d\leq0.35$, $a+b+c+d=1.5$ and $1.2\leq a+b+c\leq1.3$. Further, more suitably, n, which is the valence of M is in a range of $4\leq n\leq5$, and the spinel structure change ratio k of the transition metal oxide containing solid-solution lithium is in a range of $0.6\leq k\leq0.9$.

Figure 4:
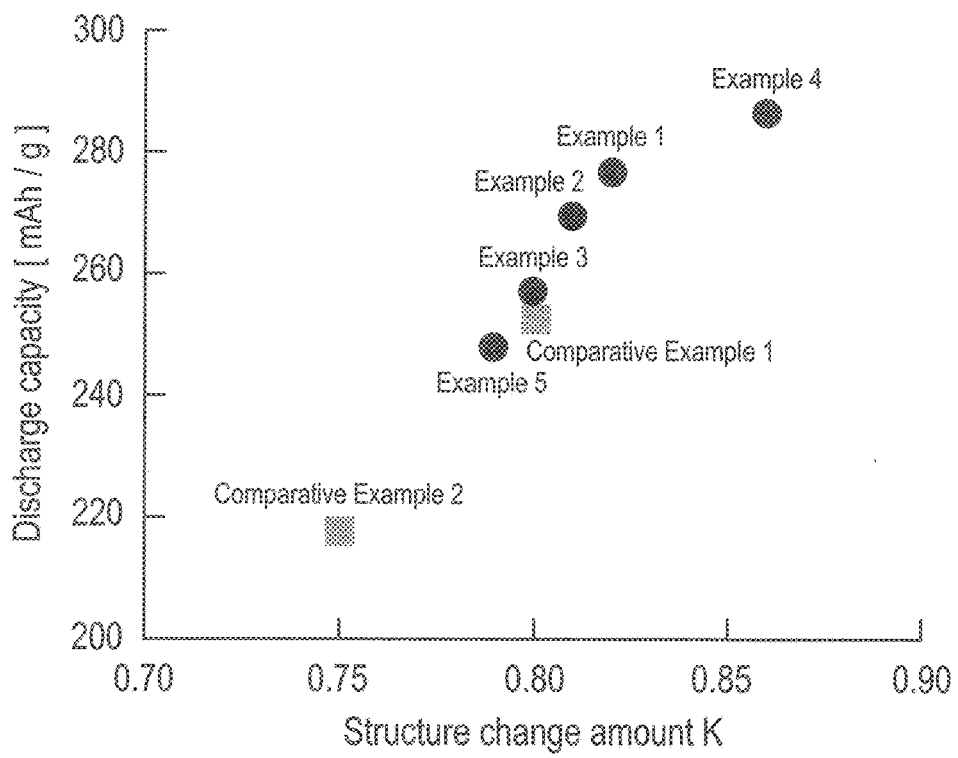
FIG. 4 is a graph illustrating the relationship of the spinel structure change ratio k and the discharge capacity.

In a lithium ion secondary battery using the transition metal oxide containing solid-solution lithium described above as a positive electrode, it is possible to obtain a desired spinel structure change ratio k of the transition metal oxide containing solid-solution lithium by performing a charge or a charge-discharge in a predetermined electric potential range. Specifically, it is possible to obtain a desired spinel structure change ratio k of the transition metal oxide containing solid-solution lithium by charge-discharge treatment of performing a charge or a charge-discharge wherein the maximum potential of the battery (positive electrode) in a predetermined electric potential range is 4.8 V as a conversion to the lithium metal counter electrode. Preferably, it is possible to obtain a more preferable range of the spinel structure change ratio k in the transition metal oxide containing solid-solution lithium (namely, those in which the structure change ratio k is increased; see FIG. 4) by performing electrochemical pretreatment of performing a charge or a charge-discharge wherein the maximum potential of the battery (positive electrode) in a predetermined electric potential range is 4.3 V or higher and less than 4.8 V as a conversion to the lithium metal counter electrode, and the charge-discharge treatment.

More specifically, as the electrochemical pretreatment, a charge or a charge-discharge is desirably performed between a maximum potential of the battery (positive electrode) of 4.3 V or higher, which is a starting point of the plateau region, and a potential lower than 4.8 V, which is the end point of the plateau region (for example, 4.7 V), as shown in Table 2 of Examples. The reason for the starting point of the plateau region set to 4.3 V or higher is that the electric potential, at which the plateau capacity is generated due to the structure change by the composition of the transition metal oxide containing solid-solution lithium, is different. Specifically, the starting point of the plateau region is set to 4.3 V or higher because the plateau capacity may be generated at less than 4.5 V (specifically between 4.3 V and 4.5 V) depending on the composition of the transition metal oxide containing solid-solution lithium, in particular, the polyvalent, different kind of element (substitution element) M. In the results of Examples, the plateau is generated near 4.5 V, and thus Examples are described as such (see Table 2). In addition, in the electrochemical pretreatment, a charge-discharge is desirably performed from (4.3 V to) 4.5 V, which is the starting point of the plateau region, to further higher maximum potential by every 0.1 V such as 4.6 V and 4.7 V in order with the constant current charge-discharge (CC-CC mode), as shown in Table 2 of Examples. This is because the spinel structure change ratio k can be held in more preferable range (namely, larger structure change ratio; see FIG. 4). In addition, in the electrochemical pretreatment, a charge-discharge may be performed repeatedly once or more times per each maximum potential, as shown in Table 2 of Examples. For example, a charge-discharge may be repeatedly performed multiple times (specifically about twice to 5 times) per each maximum potential such that a charge-discharge is repeatedly performed twice (2 cycles) at 4.5 V as shown in Table 2 of Example 1. In addition, with respect to the current rate in the electrochemical pretreatment, both of a charge and a discharge are preferably performed in a range of 0.01 to 0.5 C rate, preferably at 0.1 C rate (see Table 2), from the viewpoint of gradual change and stabilization of the crystal structure. In this way, the charge in the electrochemical pretreatment is performed at a low rate to 4.3 V or higher and less than 4.8 V of the maximum potential with constant current charge, and the discharge may be performed at a low rate to about 2.0 V of the minimum voltage of the battery with constant current charge from the viewpoint of stabilization of the crystal structure. Meanwhile, the charge or the charge-discharge may be performed at a potential of lower than 4.3 V (for example, 4.2 V) as the maximum potential of the battery (positive electrode) before the electrochemical pretreatment from the viewpoint of stabilization of the crystal structure as shown in Table 2 of Examples. Also in this case, a charge-discharge may be performed at a current rate of the range of 0.01 to 0.5 C rate, preferably at 0.1 C rate with constant current charge-discharge (CC-CC mode), similarly to the electrochemical pretreatment. The discharge at this time may be performed at a low rate to about 2.5 V of the minimum voltage of the battery from the viewpoint of stabilization of the crystal structure. In addition, resting is desirably performed between the charge and the discharge for a predetermined time (specifically, 10 minutes to 1 hour) from the viewpoint of stabilization of the crystal structure.

In addition, as the charge-discharge treatment, a charge or a charge-discharge is performed at 4.8 V that is the end point of the plateau region. Preferably, the charge-discharge treatment is desirably performed after the electrochemical pretreatment as described above. In the charge-discharge treatment, charge-discharge is performed in a range of 2.0 to 4.8 V with constant current and constant voltage charge-constant current discharge (CCCV-CC mode), whereby to obtain the spinel structure change ratio k as shown in Table 3 of Examples. In addition, with respect to the current rate in the charge-discharge treatment, both of a charge and a discharge is preferably performed at a range of 0.01 to 0.5 C rate, preferably at 0.1 C rate (see Table 3) from the viewpoint of gradual change and stabilization of the crystal structure. In this way, the charge in the charge-discharge treatment may be performed for 1 to 10 hours at a low rate to 4.8 V of the maximum potential with constant current and constant voltage charge, and the discharge may be performed at a low rate to about 2.0 V of the battery minimum voltage with constant current discharge from the viewpoint of stabilization of the crystal structure.

With respect to the spinel structure change ratio k, the plateau capacity occurring near 4.5 V is calculated (see FIG. 1A) or summed (see FIG. 1B) in a charge-discharge step of the charge-discharge treatment, preferably in each charge-discharge step of the electrochemical pretreatment and the charge-discharge treatment, and using the capacity thereof (real capacity), the k can be calculated from the above formula.

Such transition metal oxide containing solid-solution lithium can realize high discharge capacity, capacity retention rate and charge-discharge efficiency when used as a positive electrode active material of a lithium ion secondary battery, and thus is suitable used in a positive electrode for a lithium ion secondary battery, or a lithium ion secondary battery. As a result thereof, the transition metal oxide containing solid-solution lithium can be used suitably as a lithium ion secondary battery for operating a power source or auxiliary power source of a vehicle. In addition to this, the transition metal oxide containing solid-solution lithium can be sufficiently applied to a lithium ion secondary battery for household or a mobile device.

Next, a method for producing the transition metal oxide containing solid-solution lithium according to one embodiment of the present invention will be described in detail with some examples.

First, one example of a method for producing the transition metal oxide containing solid-solution lithium includes a method of producing the transition metal oxide containing solid-solution lithium by mixing raw materials containing a lithium compound, a nickel compound, a compound of a polyvalent, different kind of element M and a manganese compound of sulfate, nitrate or the like to obtain a mixture, and then calcinating the obtained mixture for 6 hours to 24 hours at 800° C. to 1000° C. under inert gas atmosphere. However, in this step, the transition metal oxide containing solid-solution lithium having the desired spinel structure change ratio k is not obtained. Thus, a battery using the transition metal oxide containing solid-solution lithium obtained with the calcination as a positive electrode is manufactured, and charge-discharge treatment, preferably electrochemical pretreatment and charge-discharge treatment are conducted, whereby to obtain the transition metal oxide containing solid-solution lithium having the desired spinel structure change ratio k.

In addition, another example of a method for producing the transition metal oxide containing solid-solution lithium includes method for producing the transition metal oxide containing solid-solution lithium by mixing raw materials containing a lithium compound, a nickel compound, a compound of a polyvalent, different kind of element M and a manganese compound of sulfate, nitrate or the like to obtain a mixture, and then calcinating the obtained mixture for 6 hours to 24 hours at 800° C. to 1000° C. to obtain a calcinated product, and then subjecting the obtained calcinated product to heat treatment at 600° C. to 800° C. under inert gas atmosphere. However, in this step, the transition metal oxide containing solid-solution lithium having the desired spinel structure change ratio k is not obtained. Thus, a battery using the transition metal oxide containing solid-solution lithium obtained with the heat treatment as a positive electrode is manufactured, and charge-discharge treatment, preferably electrochemical pretreatment and charge-discharge treatment are conducted, whereby to obtain the transition metal oxide containing solid-solution lithium having the desired spinel structure change ratio k.

Namely, in a lithium ion secondary battery using the transition metal oxide containing solid-solution lithium obtained with the calcination or heat treatment described above as a positive electrode, charge-discharge treatment of performing a charge or a charge-discharge is conducted in which the maximum potential of the battery (positive electrode) in a predetermined electric potential range is 4.8 V as a conversion to the lithium metal counter electrode. By such charge-discharge treatment, it is possible to obtain the desired spinel structure change ratio k of the transition metal oxide containing solid-solution lithium. Preferably, the electrochemical pretreatment of performing a charge or a charge-discharge in which the maximum potential of the battery (positive electrode) in a predetermined electric potential range is 4.3 V or higher and less than 4.8 V as a conversion to the lithium metal counter electrode, and the charge-discharge treatment are conducted. By such electrochemical pretreatment and charge-discharge treatment, it is possible to obtain more preferable range of the spinel structure change ratio k in the transition metal oxide containing solid-solution lithium.

Next, the positive electrode for a lithium ion secondary battery and the lithium ion secondary battery according to one embodiment of the present invention will be described in detail with reference to the figures. Meanwhile, the size ratios of the figures cited in the embodiments described below are exaggerated for convenience of explanation, and may be different from the actual ratios.

Figure 2:
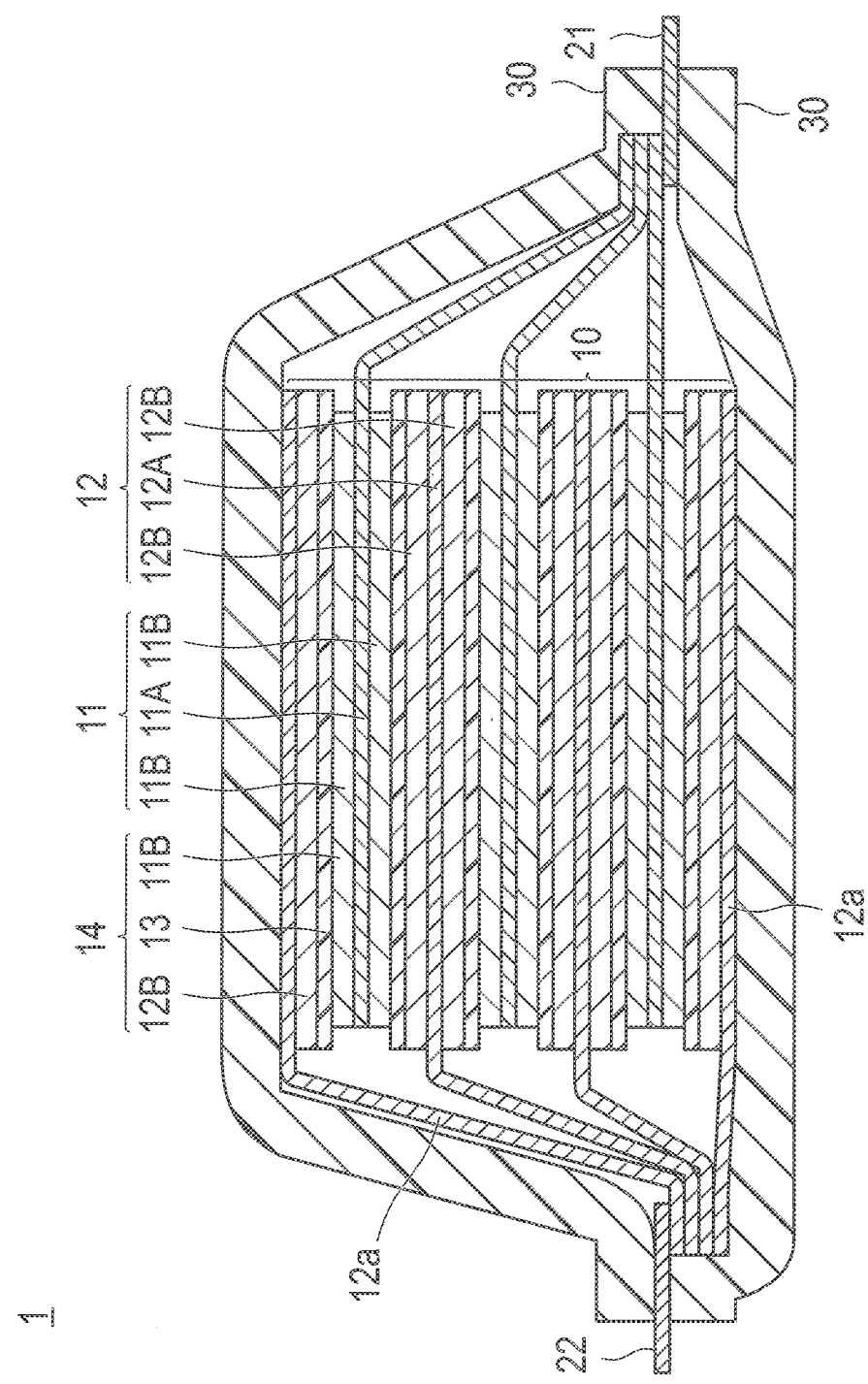
FIG. 2 is a sectional view illustrating the outline of one example of a lithium ion secondary battery according to one embodiment of the present invention.

FIG. 2 is a sectional view showing the outline of one example of the lithium ion secondary battery according to one embodiment of the present invention. Meanwhile, such a lithium ion secondary battery is called a laminate type lithium ion secondary battery.

As shown in FIG. 2, the lithium ion secondary battery 1 of the present embodiment has constitution of being enclosed in an outer casing body 30 in which a battery element 10 mounted with a positive electrode lead 21 and a negative electrode lead 22 are formed as a laminate film. Then, in the present embodiment, the positive electrode lead 21 and the negative electrode lead 22 are led in the opposite direction toward the outside from the inside of the outer casing body 30. Meanwhile, the positive electrode lead and the negative electrode lead may be led in the same direction toward the outside from the inside of the outer casing body, which is not shown in the figures. In addition, such positive electrode lead and negative electrode lead can be mounted onto the positive electrode current collector and the negative electrode current collector described below by, for example, ultrasonic welding, resistance welding or the like.

The positive electrode lead 21 and the negative electrode lead 22 are constituted with a metal material such as aluminum (Al), copper (Cu), titanium (Ti), nickel (Ni), an alloy thereof and stainless steel (SUS). However, the positive electrode lead 21 and the negative electrode lead 22 are not limited to these, but a conventional, known material used as a lead for a lithium ion secondary battery may be used.

Meanwhile, the positive electrode lead and the negative electrode lead may use the same material, or may use different materials. In addition, as in the present embodiment, a separately prepared lead may be connected to the positive electrode current collector and the negative electrode current collector described below, or the leads may be formed by extending each positive electrode current collector and each negative electrode current collector described below, respectively. A positive electrode lead and a negative electrode lead of a portion led from the outer casing body are preferably coated with a heat resistant and insulating thermally shrunken tube or the like so that it has no influence on a product (for example, an automobile component, particularly an electronic device and the like) according to electric leak after contact with neighboring instruments or wirings, which is not shown in the figures.

In addition, a current collecting plate may be used in order to lead the current to the outside of the battery, which is not shown in the figures. The current collecting plate is electrically connected to the current collector or lead, and led to the outside of a laminate film that is an outer casing material of the battery. A material constituting the current collecting plate is not particularly limited, and a known high-conductive material conventionally used as a current collecting plate for a lithium ion secondary battery may be used. As a material constituting the current collecting plate, for example, a metal material such as aluminum (Al), copper (Cu), titanium (Ti), nickel (Ni), an alloy thereof and stainless steel (SUS) is preferable, and aluminum (Al), copper (Cu) and the like are more preferable from the viewpoint of light weightiness, resistance to corrosion and high conductivity. Meanwhile, the positive electrode current collecting plate and the negative electrode current collecting plate may use the same material, or may use different materials.

The outer casing body 30 is preferably formed with a film-shaped outer casing material from the viewpoint of, for example, miniaturization and light weightiness, but is not limited thereto, and those conventional, known and used in a lithium ion secondary battery for outer casing body may be used. Specifically, a metal can case may be applied.

Meanwhile, examples of the outer casing body 30 include, for example, a polymer-metal composite laminate film that is excellent in heat conductivity from the viewpoint of excellent high output and cooling performance and suitable use for a battery for a large instrument of an electric car or a hybrid electric car. More specifically, an outer casing body may be suitable used, which is formed with an outer casing material of a 3-layer structured laminate film formed by laminating polypropylene as a heat crimping layer, aluminum as a metal layer and Nylon as an outer protecting layer in the order stated.

Meanwhile, the outer casing body may be constituted with another structure in place of the laminate film described above, for example, a laminate film not having a metal material, a polymer film of polypropylene or the like, or a metal film, or the like.

Herein, general constitution of the outer casing body can be represented by a layered structure of outer protecting layer/metal layer/heat crimping layer (however, the outer protecting layer and the heat crimping layer may be constituted in multiple layers). Meanwhile, the metal layer is not limited if it functions as a barrier membrane having resistance to moisture permeability. Not only an aluminum foil, but also a stainless steel foil, a nickel foil, an iron foil treated with metal-plating and or like may be used, but an aluminum foil may be suitably used, which is thin and has light weightiness and excellent processability.

Examples of the constitution that can be used as the outer casing body in the format of (the outer protecting layer/metal layer/heat crimping layer) include Nylon/aluminum/unstretched polypropylene, polyethylene terephthalate/aluminum/unstretched polypropylene, polyethylene terephthalate/aluminum/polyethylene terephthalate/unstretched polypropylene, polyethylene terephthalate/Nylon/aluminum/unstretched polypropylene, polyethylene terephthalate/Nylon/aluminum/Nylon/unstretched polypropylene, polyethylene terephthalate/Nylon/aluminum/Nylon/polyethylene, Nylon/polyethylene/aluminum/linear low density polyethylene, polyethylene terephthalate/polyethylene/aluminum/polyethylene terephthalate/low density polyethylene, and polyethylene terephthalate/Nylon/aluminum/low density polyethylene/unstretched polypropylene and the like.

As shown in FIG. 2, the battery element 10 is constituted such that a positive electrode 11 in which a positive electrode active material layer 11B is formed on the principal surface of both sides of a positive electrode current collector 11A; an electrolyte layer 13; and a negative electrode 12 in which a negative electrode active material layer 12B is formed on the principal surface of both sides of a negative electrode current collector 12A, are stacked in multiple layers. At this time, the positive electrode active material layer 11B formed on one side of the principal surface of the positive electrode current collector 11A of one positive electrode 11, and the negative electrode active material layer 12B formed on one side of principal surface of the negative electrode current collector 12A of a negative electrode 12 adjacent to the one positive electrode 11, are faced with each other via the electrolyte layer 13. In this way, the positive electrode, the electrolyte layer and the negative electrode are stacked in multiple layers in order.

Accordingly, the neighboring positive electrode active material layer 11B, the electrolyte layer 13 and the negative electrode active material layer 12B constitutes one single battery layer 14. Accordingly, the lithium ion secondary battery 1 of the present embodiment is constituted such that multiple single battery layers 14 are stacked, and thereby electrically connected in parallel. Meanwhile, the positive electrode and the negative electrode may be those in which each active material layer is formed on the principal surface of one side of each current collector. In the present embodiment, for example, the negative electrode active material layer 12B is formed on only one side of the negative electrode current collector 12a that is located on the outermost layer of the battery element 10.

In addition, an insulating layer (not shown) may be disposed to insulate the neighboring positive electrode current collector and negative electrode current collector on the circumference of the single battery layer. Such insulating layer is preferably formed with a material that retains the electrolyte contained in the electrolyte layer or the like, and prevents leakage of the electrolyte to the circumference of the single battery layer. Specifically, a general plastic or a thermoplastic olefin rubber such as polypropylene (PP), polyethylene (PE), polyurethane (PUR), polyimide-based resin (PA), polytetrafluoroethylene (PTFE), polyvinylidene fluoride (PVdF) and polystyrene (PS), or the like may be used. In addition, a silicone rubber may be also used.

The positive electrode current collector 11A and the negative electrode current collector 12A are constituted with a conductive material. The size of the current collector can be determined depending on use of the battery. For example, if a large battery, which requires high energy density, is used, a current collector having a large area is used. The thickness of the current collector is not particularly limited either. The thickness of the current collector is usually about 1 to 100 μm. The shape of the current collector is not particularly limited either. In the battery element 10 shown in FIG. 2, a mesh shape (expand grid and the like) or the like may be used in addition to a current collecting foil.

Meanwhile, in a case where a thin film alloy, which is one example of the negative electrode active material, is directly formed on the negative electrode current collector 12A by sputtering or the like, a current collecting foil is desirably used.

A material for constituting the current collector is not particularly limited. For example, a metal, or a resin in which conductive filler is added to a conductive polymer material or non-conductive polymer material, may be adopted.

Specifically, examples of the metal include aluminum (Al), nickel (Ni), iron (Fe), stainless steel (SUS), titanium (Ti), copper (Cu) and the like. In addition to them, a clad material of nickel (Ni) and aluminum (Al), a clad material of copper (Cu) and aluminum (Al), or a plating material made from combination of these metals, or the like is preferably used. In addition, the metal may be a foil coated with aluminum (Al) on the metal surface. Among them, aluminum (Al), stainless steel (SUS), copper (Cu) or nickel (Ni) is preferable from the viewpoint of electron conductivity, battery operating potential and the like.

In addition, examples of the conductive polymer material include, for example, polyaniline, polypyrrole, polythiophene, polyacetylene, polyparaphenylene, polyphenylenevinylene, polyacrylonitrile, polyoxadiazole and the like. Such conductive polymer material has enough conductivity without addition of a conductive filler, and thus is advantageous in the point of simplification of production process or light weightiness of the current collector.

Examples of the non-conductive polymer material include, for example, polyethylene (PE; high density polyethylene (HDPE), low density polyethylene (LDPE) and the like), polypropylene (PP), polyethylene terephthalate (PET), polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), polystyrene (PS) and the like. Such non-conductive polymer material has excellent resistance to potential or resistance to solvent.

Conductive filler may be added to the conductive polymer material or non-conductive polymer material as necessary. Particularly, in a case where the resin that is a base material of the current collector consists only of the non-conductive polymer, conductive filler is necessarily essential in order to grant conductivity to the resin. The conductive filler is not particularly limited, and a material having conductivity may be used. For example, examples of the conductive filler include a metal, conductive carbon and the like as a material excellent in conductivity, resistance to potential or lithium ion blocking.

Suitable examples of the metal include at least one kind of metal selected from the group consisting of nickel (Ni), titanium (Ti), aluminum (Al), copper (Cu), platinum (Pt), iron (Fe), chromium (Cr), tin (Sn), zinc (Zn), indium (In), antimony (Sb) and potassium (K), or alloys or metal oxides containing these metals. In addition, suitable examples of the conductive carbon include at least one kind selected from the group consisting of acetylene black, Vulcan, black pearl, carbon nanofiber, Ketjenblack, carbon nanotube, carbon nanohorn, carbon nanoballoon and fullerene. The addition amount of the conductive filler is not particularly limited if it is an amount granting enough conductivity to the current collector, and is generally about 5 to 35 mass %.

However, a material for constituting the current collector is not limited to these, and a conventional, known material used as a current collector for a lithium ion secondary battery may be used.

The positive electrode active material layer 11B contains at least one kind of the transition metal oxide containing solid-solution lithium according to an embodiment of the present invention described above as a positive electrode active material, and may contain a binding agent or a conductive aid as necessary.

The binding agent (binder) is not particularly limited, but examples thereof include, for example, the materials described below.

Examples of the binding agent include thermoplastic polymers such as polyethylene (PE), polypropylene (PP), polyethylene terephthalate (PET), polyether nitrile (PEN), polyacrylonitrile (PAN), polyimide (PI), polyamide (PA), cellulose, carboxymethyl cellulose (CMC), an ethylene-vinyl acetate copolymer, polyvinyl chloride (PVC), styrene and butadiene rubber (SBR), isoprene rubber, butadiene rubber, ethylene-propylene rubber, an ethylene-propylene-diene copolymer, a styrene-butadiene-styrene block copolymer and a hydrogen adduct thereof, a styrene-isoprene-styrene block copolymer and a hydrogen adduct thereof; fluorine resins such as polyvinylidene fluoride (PVDF), polytetrafluoroethylene (PTFE), a tetrafluoroethylene-hexafluoropropylene copolymer (FEP), a tetrafluoroethylene-perfluoroalkylvinyl ether copolymer (PFA), an ethylene-tetrafluoroethylene copolymer (ETFE), polychlorotrifluoroethylene (PCTFE), an ethylene-chlorotrifluoroethylene copolymer (ECTFE), polyvinyl fluoride (PVF); vinylidene fluoride-based fluorine rubbers such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethylvinyl ether-tetrafluoroethylene-based fluorine rubber (VDF-PFMVE-TFE-based fluorine rubber) and vinylidene fluoride-chlorotrifluoroethylene-based fluorine rubber (VDF-CTFE-based fluorine rubber); epoxy resins and the like. Among them, polyvinylidene fluoride, polyimide, styrene and butadiene rubber, carboxymethyl cellulose, polypropylene, polytetrafluoroethylene, polyacrylonitrile and polyamide are more preferable. These suitable binders are excellent in heat resistance, and further has very broad potential window, and are stable for both of the positive electrode potential and the negative electrode potential, and can be used in the layer of the positive electrode (and negative electrode) active material.

However, the binding agent is not limited thereto, and a known material conventionally used as a binding agent for a lithium ion secondary battery may be used. These binding agents may be used alone in only one kind, or two or more thereof may be used in combination.

The amount of the binding agent (binder) contained in the positive electrode active material layer is not particularly limited as long as the binding agent can bind the positive electrode active material, but is preferably 0.5 to 15 mass %, and more preferably 1 to 10 mass % relative to the positive electrode active material layer.

A conductive aid is blended in order to improve conductivity of the positive electrode active material layer. Examples of the conductive aid include, for example, carbon materials such as carbon black, e.g., acetylene black, graphite and vapor phase epitaxy carbon fiber. If the positive electrode active material layer contains the conductive aid, electron network in the positive electrode active material layer is effectively formed, which can contribute to improvement of the output property of the battery.

However, the conductive aid is not limited thereto, and a conventional, known material used as a conductive aid for a lithium ion secondary battery may be used. These conductive aids may be used alone in only one kind, or two or more thereof may be used in combination.

In addition, a conductive binding agent having both functions of the conductive aid and the binding agent may be used in place of these conductive aid and binding agent, or may be used in combination with either one or both of these conductive aid and binding agent. As the conductive binding agent, for example, already commercially marketed TAB-2 (manufactured by Hohsen Corp.) may be used.

Further, the density of the positive electrode active material layer is suitably 2.5 $g/cm^3$ to 3.0 $g/cm^3$. When the density of the positive electrode active material layer is 2.5 $g/cm^3$ or higher, it is possible to improve the weight per unit volume (filling amount), and improve discharge capacity. In addition, when the density of the positive electrode active material layer is 3.0 $g/cm^3$ or less, it is advantageous in a point that the pore amount of the positive electrode active material layer does not remarkably decrease, and permeability of a non-aqueous electrolytic solution or lithium ion diffusibility is excellent.

The negative electrode active material layer 12B contains lithium, a lithium alloy, or a negative electrode material that can absorb and desorb lithium as a negative electrode active material, and may contain a binding agent or a conductive aid as necessary. Meanwhile, as the binding agent or the conductive aid, those illustrated above may be used.

Examples of the negative electrode material that can absorb and desorb lithium include, for example, carbon materials (including those containing 10 mass % or less of silicon nanoparticle) such as graphite (natural graphite, artificial graphite and the like) that is a high crystalline carbon, a low crystalline carbon (soft carbon, hard carbon), carbon black (Ketjenblack, acetylene black, channel black, lamp black, oil furnace black, thermal black and the like), fullerene, carbon nanotube, carbon nanofiber, carbon nanohorn and carbon fibril; a simple material of an element that forms an alloy with lithium such as silicon (Si), germanium (Ge), tin (Sn), lead (Pb), aluminum (Al), indium (In), zinc (Zn), hydrogen (H), calcium (Ca), strontium (Sr), barium (Ba), ruthenium (Ru), rhodium (Rh), iridium (Ir), palladium (Pd), platinum (Pt), silver (Ag), gold (Au), cadmium (Cd), mercury (Hg), gallium (Ga), thallium (Tl), carbon (C), nitrogen (N), antimony (Sb), bismuth (Bi), oxygen (O), sulfur (S), selenium (Se), tellurium (Te) and chlorine (Cl), and oxides (silicon monoxide (SiO), $SiO_x$ (0<x<2), tin dioxide ($SnO_2$), $SnO_x$ (0<x<2), $SnSiO_3$ and the like) and carbides (silicon carbide (SiC) and the like) containing these elements, and the like; a metal material such as lithium metal; and a lithium-transition metal composite oxide such as lithium-titanium composite oxide (lithium titanate: $Li_4Ti_5O_{12}$). However, the negative electrode material is not limited thereto, and a conventional, known material used as a negative electrode active material for a lithium ion secondary battery may be used. These negative electrode active materials may be used alone in only one kind, or two or more thereof may be used in combination.

In addition, in the present embodiment, it is preferable that the carbon material is coated with an amorphous carbon layer on the surface, and consists of a graphite material that is not squamous, and suitably the BET specific surface area of the carbon material is 0.8 $m^2/g$ to 1.5 $m^2/g$ and the tap density is 0.9 $g/cm^3$ to 1.2 $g/cm^3$. The carbon material that is coated with an amorphous carbon layer on the surface, and consists of a graphite material that is not squamous, has high lithium ion diffusibility into the graphite layered structure, and is preferable. In addition, if the BET specific surface area of such carbon material is 0.8 $m^2/g$ to 1.5 $m^2/g$, it is preferable since the capacity retention rate can be further improved. Further, if the tap density of such carbon material is 0.9 g/cm³ to 1.2 g/cm³, it is possible to improve the weight per unit volume (filling amount), and improve the discharge capacity.

Further, in the present embodiment, it is preferable that BET specific surface area of the negative electrode active material layer at least containing the carbon material and the binding agent is suitably 2.0 m²/g to 3.0 m²/g. By the BET specific surface area of the negative electrode active material layer being 2.0 m²/g to 3.0 m²/g, it is possible to improve the permeability of the non-aqueous electrolytic solution, and further improve the capacity retention rate, and suppress gas generation by decomposition of non-aqueous electrolytic solution.

In addition, in the present embodiment, it is preferable that BET specific surface area after pressure molding of the negative electrode active material layer at least containing the carbon material and the binding agent is suitably 2.01 m²/g to 3.5 m²/g. By the BET specific surface area after pressure molding of the negative electrode active material layer being 2.01 m²/g to 3.5 m²/g or less, it is possible to improve the permeability of the non-aqueous electrolytic solution, and further improve the capacity retention rate, and suppress gas generation by decomposition of the non-aqueous electrolytic solution.

Further, in the present embodiment, it is preferable that increment of the BET specific surface area before and after pressure press molding of the negative electrode active material layer at least containing the carbon material and the binding agent is suitably 0.01 m²/g to 0.5 m²/g. It is possible to render BET specific surface area after pressure molding of the negative electrode active material layer to be 2.01 m²/g to 3.5 m²/g, and thus it is possible to improve the permeability of the non-aqueous electrolytic solution, and further improve the capacity retention rate, and suppress gas generation by decomposition of the non-aqueous electrolytic solution.

In addition, the thickness of each active material layer (active material layer on one side of the current collector) is not particularly limited either, and reference can be made properly to conventional, known knowledges about a battery. For example, the thickness of each active material layer is usually about 1 to 500 μm and preferably 2 to 100 μm in consideration of the object of use of the battery (serious consideration on output, serious consideration on energy and the like) and ion conductivity.

Further, in a case where optimal particle diameters are different in exerting inherent effects of each active material, optimal particle diameters may be mixed and used in exerting each inherent effect, and it is not necessary to unify the particle diameters of all of the active materials.

For example, in a case where oxide in the particle form is used as the positive electrode active material, the average particle diameter of the oxide is not particularly limited as long as it is approximately the same as the average particle diameter of the positive electrode active material contained in existing positive electrode active material layer. The average particle diameter of the oxide is preferably in a range of 1 to 20 μm from the viewpoint of high output. Meanwhile, in the specification, the "particle diameter" means a maximum distance among distances between any two points on the outline of the active material particle observed (observed face) using observation means such as a scanning electron microscope (SEM) and a transmission electron microscope (TEM). As the values of "average particle diameter", adopted is a value calculated as an average value of the particle diameters of particles observed in several to several tens visual field using observation means such as an scanning electron microscope (SEM) and a transmission electron microscope (TEM). The particle diameters and the average particle diameters of the other components can be similarly defined.

However, it goes without saying that the average particle diameters are not limited to such a range, but may be beyond this range as long as the effects of the present embodiment can be effectively exerted.

Examples of the electrolyte layer 13 include, for example, a layer structure formed using an electrolytic solution, a polymer gel electrolyte or a solid polymer electrolyte retained in the separator described below, and further a layered structure formed using a polymer gel electrolyte or a solid polymer electrolyte, and the like.

The electrolytic solution is preferably, for example, those usually used in a lithium ion secondary battery, and specifically have a form in which a supporting salt (lithium salt) is dissolved in an organic solvent. Examples of the lithium salt include, for example, at least one kind lithium salt selected from inorganic acid anion salts such as lithium hexafluorophosphate ($LiPF_6$), lithium tetrafluoroborate ($LiBF_4$), lithium perchlorate ($LiClO_4$), lithium hexafluooarsenate ($LiAsF_6$), lithium hexafluorotantalate ($LiTaF_6$), lithium tetrachloroaluminate ($LiAlCl_4$) and lithium decachlorodecaborate ($Li_2B_{10}Cl_{10}$), and organic acid anion salts such as lithium trifluoromethane sulfonate ($LiCF_3SO_3$), lithium bis(trifluoromethanesulfonyl)imide ($Li(CF_3SO_2)_2N$) and lithium bis(pentafluoroethanesulfonyl)imide ($Li(C_2F_5SO_2)_2N$), and the like. In addition, as the organic solvent, use can be made of, for example, an organic solvent such as a non-protonic solvent, which is at least one kind selected from cyclic carbonates such as propylene carbonate (PC) and ethylene carbonate (EC); chain carbonates such as dimethyl carbonate (DMC), methyl ethyl carbonate (EMC) and diethyl carbonate (DEC); ethers such as tetrahydrofuran, 2-methyl tetrahydrofuran, 1,4-dioxane, 1,2-dimethoxyethane and 1,2-dibutoxyethane; lactones such as γ-butyrolactone; nitriles such as acetonitrile; esters such as methyl propionate; amides such as dimethyl formamide; methyl acetate and methyl formate, or a mixture of two or more, and the like. Meanwhile, examples of the separator include, for example, a microporous membrane or porous flat plate consisting of polyolefins such as polyethylene (PE) and polypropylene (PP), and further non-woven fabric.

Examples of the polymer gel electrolyte include those containing a polymer and an electrolytic solution constituting a polymer gel electrolyte in a conventional, known ratio. For example, the ratio is desirably about several mass % to 98 mass % from the viewpoint of ion conductivity and the like.

The polymer gel electrolyte is those containing the electrolytic solution used usually in a lithium ion secondary battery, in a solid polymer electrolyte having ion conductance. However, the polymer gel electrolyte is not limited thereto, and also includes those retaining a similar electrolytic solution in the skeleton of a polymer not having lithium ion conductance.

The examples of the polymer not having lithium ion conductance used as the polymer gel electrolyte, include, for example, polyvinylidene fluoride (PVdF), polyvinyl chloride (PVC), polyacrylonitrile (PAN), polymethyl methacrylate (PMMA) and the like. However, the polymer not having lithium ion conductance is not limited thereto. Meanwhile, polyacrylonitrile (PAN), polymethyl methacrylate (PMMA) and the like are exemplified herein as a polymer not having lithium ion conductance used as a polymer gel electrolyte although they would rather belong to a class hardly having ion conductivity, and thus can be also the polymer having ion conductivity.

Examples of the solid polymer electrolyte include, for example, those having constitution formed by dissolving the lithium salt in polyethylene oxide (PEO), polypropylene oxide (PPO) or the like, and not containing an organic solvent. As such, in a case where the electrolyte layer is constituted with the solid polymer electrolyte, there is no fear of leakage from the battery, and reliability of the battery can be improved.

The thickness of the electrolyte layer is preferably thin from the viewpoint of reducing the internal resistance. The thickness of the electrolyte layer is usually 1 to 100 μm, and preferably 5 to 50 μm.

Meanwhile, a matrix polymer of the polymer gel electrolyte or the solid polymer electrolyte may form a cross-linking structure whereby to exert excellent mechanical strength. In formation of the cross-linking structure, polymerization treatment such as heat polymerization, ultraviolet polymerization, radiation polymerization and electron beam polymerization may be performed with respect to a polymeric polymer for forming the polymer electrolyte (for example, polyethylene oxide (PEO) and polypropylene oxide (PPO)) using a suitable polymerization initiator.

The shape (constitution) of the present embodiment of a lithium ion secondary battery is not particularly limited, and various shapes such as a rectangle shape, a paper type, a stack type, a cylinder type, a coin type and the like may be adopted in addition to the laminate type (and stack type) as shown in FIG. 2. In addition, the components include a current collector, an insulating plate and the like (see the coin cell of Examples), but are not particularly limited thereto, and may be selected depending on the shape mentioned above.

Next, a method for producing the lithium ion secondary battery of the present embodiment described above will be described with some examples.

One example of a method for producing a lithium ion secondary battery will be described. First, a positive electrode is manufactured. For example, in a case where granular positive electrode active materials are used, the transition metal oxide containing solid-solution lithium described above (for example, those obtained by calcination as one example of the production method mentioned above) and, as necessary, a conductive aid, a binding agent (binder) and a viscosity-adjusting solvent are mixed, and a slurry for an positive electrode is manufactured.

Then, this slurry for an positive electrode is applied to a positive electrode current collector, dried, and subjected to pressure molding to form a positive electrode active material layer, whereby to obtain a positive electrode.

In addition, a negative electrode is manufactured. For example, in a case where granular negative electrode active materials are used, a negative electrode active material, and as necessary, a conductive aid, a binding agent (binder) and a viscosity-adjusting solvent are mixed, and a slurry for a negative electrode is manufactured. Then, this slurry for a negative electrode is applied to a negative electrode current collector, dried, and subjected to pressure molding to form a negative electrode active material layer, whereby to obtain a negative electrode.

Then, a positive electrode lead is mounted on the positive electrode obtained above, and a negative electrode lead is mounted on the negative electrode obtained above, and then the positive electrode, a separator and the negative electrode are stacked. Further, the stack is sandwiched by polymer-metal composite laminate sheets, and the circumferential edges are heat-welded except for one side to obtain a bag-shaped outer casing body.

Then, a non-aqueous electrolyte containing a lithium salt such as lithium hexafluorophosphate and an organic solvent such as ethylene carbonate is prepared, and injected into the inside from the opening of the outer casing body, and the opening of the outer casing body is heat-welded and enclosed. Accordingly, a laminate type lithium ion secondary battery is obtained. Next, the obtained lithium ion secondary battery is subjected to the charge-discharge treatment, preferably the electrochemical pretreatment and the charge-discharge treatment described above, whereby to render the spinel structure change ratio k of the transition metal oxide containing solid-solution lithium used in the positive electrode active material to be in a desired range ($0.25 \leq k < 1.0$). Accordingly, the lithium ion secondary battery of the present embodiment is completed.

Another example of a method for producing a lithium ion secondary battery will be described. First, a positive electrode is manufactured. For example, in a case where granular positive electrode active materials are used, the transition metal oxide containing solid-solution lithium described above (for example, those for the obtained by heat treatment as one example of the production method described above), and as necessary, a conductive aid, a binding agent (binder) and a viscosity-adjusting solvent are mixed, and a slurry for an positive electrode is manufactured.

Then, this slurry for an positive electrode is applied to a positive electrode current collector, dried, and subjected to pressure molding to form a positive electrode active material layer, whereby to obtain a positive electrode.

In addition, a negative electrode is manufactured. For example, in a case where granular negative electrode active materials are used, a negative electrode active material, and as necessary, a conductive aid, a binding agent (binder) and a viscosity-adjusting solvent are mixed, and a slurry for a negative electrode is manufactured. Then, this slurry for a negative electrode is applied to a negative electrode current collector, dried, and subjected to pressure molding to form a negative electrode active material layer, whereby to obtain a negative electrode.

Then, a positive electrode lead is mounted on the positive electrode, and a negative electrode lead is mounted on the negative electrode, and then the positive electrode, a separator and the negative electrode are stacked. Further, the stack is sandwiched by polymer-metal composite laminate sheets, and the circumferential edges are heat-welded except for one side to obtain a bag-shaped outer casing body.

Then, a non-aqueous electrolyte containing a lithium salt such as lithium hexafluorophosphate and an organic solvent such as ethylene carbonate is prepared, and injected into the inside from the opening of the outer casing body, and the opening of the outer casing body is heat-welded and enclosed. Further, the predetermined charge or charge-discharge described above is performed, and accordingly, a laminate type lithium ion secondary battery is obtained. Next, the obtained lithium ion secondary battery is subjected to the charge-discharge treatment, preferably the electrochemical pretreatment and the charge-discharge treatment described above, whereby to render the spinel structure change ratio k of the transition metal oxide containing solid-solution lithium used in the positive electrode active material to be in a desired range ($0.25 \leq k < 1.0$). Accordingly, the lithium ion secondary battery of the present embodiment is completed.

Hereinafter, the present invention will be further described in detail with Examples and Comparative Examples. However, the technical scope of the present invention is not limited thereto the Examples below.

Example 1

<Composition of Positive Electrode Active Material 10 (Transition Metal Oxide Containing Solid-Solution Lithium)>

As a positive electrode active material 10, the compositional formula: $Li_{1.5}[Ni_{0.285}Co_{0.015}V_{0.015}Mn_{0.885}[Li]_{0.3}]O_3$ (wherein the compositional formula corresponds to the compositional formula (1) wherein a=0.285, b=0.03 (0.015+0.015), c=0.885, d=0.30, a+b+c+d=1.5, a+b+c=1.2, and n, which is the valence of M={trivalence (valence of Co)+pentavalence (valence of V)}÷2=tetravalence) was used. This positive electrode active material 10 was synthesized as described below.

<Synthesis of Positive Electrode Active Material 10>

The positive electrode active material 10 (transition metal oxide containing solid-solution lithium) of this Example was synthesized using composite carbonate salt method. First, sulfates of Li, Ni, Mn and a polyvalent, different kind of element (substitution element) M (=Co, V) were used as starting materials, and each metal was mixed in predetermined amounts to meet the above-mentioned compositional formula, and then prepared as 2M aqueous solution of composite sulfate. 2M aqueous solution of sodium carbonate was used as a precipitant, and 0.2M aqueous solution of ammonia was used in pH adjustment. The aqueous solution of composite sulfate stirred with a magnetic stirrer was dropped with an aqueous solution of sodium carbonate to precipitate a precursor. The obtained precipitate was dried to obtain a precursor. Then, the obtained precursor and lithium hydroxide were crashed and mixed in a predetermined molar ratio, pre-calcinated at 500° C., and then calcinated for 12 hours to 24 hours at 800° C. to 1000° C. in the atmosphere, whereby to obtain the intended sample (positive electrode active material 10).

<Composition of Slurry for Positive Electrode>

| | |
|---|---|
| Positive electrode active material: powder of positive electrode active material | 90 weight parts |
| Conductive aid: flaky graphite | 1 weight part |
| acetylene black | 4 weight parts |
| Binding agent: polyvinylidene fluoride (PVDF) | 5 weight parts |
| Viscosity-adjusting solvent: N-methyl pyrrolidone (NMP) | 74 weight parts |

<Production of Slurry for Positive Electrode>

A slurry for a positive electrode having the composition described above was prepared as described below. First, 5.0 weight parts of PVDF as a binding agent (binder) were dissolved in 50.0 weight parts of NMP as a viscosity-adjusting solvent whereby to manufacture a binder solution. Next, 1.0 weight parts of flaky graphite and 4.0 weight parts of acetylene black (total 5.0 weight parts) as a conductive aid, and 90 weight parts of the powder of the positive electrode active material 10 obtained in the synthesis above as a positive electrode active material powder were added to 60.0 weight parts of the binder solution, and kneaded with a planetary mixer (HIVIS MIX 2P-03 type manufactured by PRIMIX Corporation). Then, 24.0 weight parts of NMP as a viscosity-adjusting solvent were added to the kneaded matter, to obtain a slurry for an positive electrode (60 weight % of the solid concentration).

<Application and Dry of Slurry for Positive Electrode>

The slurry for an positive electrode was applied onto one side of an aluminum current collecting foil (sheet-shaped) having 20 μm thickness as a current collector with a bar coater (to generally 3.5 mg/cm² of the weight of the positive electrode active material layer after drying). Subsequently, this current collecting foil applied with the positive electrode slurry was dried on a hot plate (for 10 minutes of dry time at 120° C. to 130° C.), whereby to form a positive electrode active material layer. The amount of NMP remaining on the positive electrode active material layer was made 0.02 weight % or less by the drying. Accordingly, a sheet-shaped positive electrode was obtained.

<Press of Positive Electrode>

Next, the sheet-shaped positive electrode was pressure-molded with a roller press, and cut to prepare a positive electrode C1 having about 3.5 mg/cm² of the weight of the positive electrode active material layer on one side, about 50 μm of the thickness, and 2.70 g/cm³ of the density.

<Drying of Positive Electrode>

Next, using this positive electrode C1, dry treatment was performed with a vacuum dry furnace. The positive electrode C1 was disposed in the drying furnace, and then pressure-reduced (100 mmHg (1.33×10⁴ Pa)) at room temperature (25° C.) to remove the air in the drying furnace. Subsequently, the drying furnace was heated to 120° C. at 10° C./minute while nitrogen gas was circulated (100 cm³/minute), and pressure-reduced again at 120° C., and maintained for 12 hours with the nitrogen in the furnace being exhausted, and then cooled to room temperature. In this way, the positive electrode C11 was obtained.

<Manufacture of Lithium Ion Secondary Battery>

Manufacture of a lithium ion secondary battery was performed with the conditions as described below.

The positive electrode C11 manufactured above was punched in 15 mm of the diameter (φ), and then again dried for 2 hours at 100° C. with a vacuum drying machine before manufacture of the battery, and used. In addition, the polypropylene porous membrane, coin cell member or the like punched in 15 mm diameter (φ) used as a separator was previously dried for 24 hours or more at room temperature in a glovebox of argon gas atmosphere, and used.

A coin cell 2032 type was manufactured as a lithium ion secondary battery. As a negative electrode (active material), a metal Li punched in 15 mm of the diameter (φ) was used. As a non-aqueous-based electrolytic solution, 150 μl of a solution of $LiPF_6$ as a supporting salt dissolved in a concentration of 1M (mol/L) in an organic solvent obtained by mixing ethylene carbonate (EC) and diethyl carbonate (DEC) in a ratio of EC:DEC=1:2 (volume ratio) was used. Special additives and the like were not used in the electrolytic solution.

Procedures for manufacture of a lithium ion secondary battery of coin cell 2032 type are described below. The positive and negative electrodes were placed opposite via two polypropylene porous membranes having 20 μm thickness between the positive electrode C11 and the negative electrode (metal Li) in the glovebox of argon gas atmosphere, and a stack body in which the negative electrode, the separator and the positive electrode were stacked in order, was manufactured. A stack body of the negative electrode, the separator and the positive electrode stacked in order was disposed on the bottom of a coin cell (outer casing can; CR2032, material: stainless steel (SUS316)). Then, a gasket was mounted in order to maintain insulation between the positive and negative electrodes, and then an electrolytic solution was injected using a syringe. A spring and a spacer were stacked, and then the top of the coin cell (cover of the outer casing can) was overlaid, and caulking was performed to obtain a lithium ion secondary battery 1 of coin cell 2032 type.

Example 2

As a positive electrode active material 11,
the compositional formula: $Li_{1.5}[Ni_{0.285}Mo_{0.03}Mn_{0.885}[Li]_{0.3}]O_3$ (wherein the compositional formula corresponds to the compositional formula (1) wherein a=0.285, b=0.03, c=0.885, d=0.30, a+b+c+d=1.5, a+b+c=1.2, and n, which is the valence of M=hexavalence (valence of Mo)) was used. This positive electrode active material 11 was synthesized in the same manner as Example 1.

A positive electrode C22, and a lithium ion secondary battery 2 of coin cell 2032 type were obtained in the same manner as Example 1 except that 90 weight parts of this positive electrode active material 11 was used.

Example 3

As a positive electrode active material 12,
the compositional formula: $Li_{1.5}[Ni_{0.285}Mg_{0.015}Mo_{0.015}Mn_{0.885}[Li]_{0.3}]O_3$ (wherein the compositional formula corresponds to the compositional formula (1) wherein a=0.285, b=0.03 (0.015+0.015), c=0.885, d=0.30, a+b+c+d=1.5, a+b+c=1.2, and n, which is the valence of M={divalence (valence of Mg)+hexavalence (Mo the valence of)}÷2=tetravalence) was used. This positive electrode active material 12 was synthesized in the same manner as Example 1.

A positive electrode C33, and a lithium ion secondary battery 3 of coin cell 2032 type were obtained in the same manner as Example 1 except that 90 weight parts of this positive electrode active material 12 was used.

Example 4

As a positive electrode active material 13,
the compositional formula: $Li_{1.5}[Ni_{0.285}Bi_{0.03}Mn_{0.885}[Li]_{0.3}]O_3$ (wherein the compositional formula corresponds to the compositional formula (1) wherein a=0.285, b=0.03, c=0.885, d=0.30, a+b+c+d=1.5, a+b+c=1.2, and n, which is the valence of M=pentavalence (valence of Bi)) was used. This positive electrode active material 13 was synthesized in the same manner as Example 1.

A positive electrode C44, and a lithium ion secondary battery 4 of coin cell 2032 type were obtained in the same manner as Example 1 except that 90 weight parts of this positive electrode active material 13 was used.

Example 5

As a positive electrode active material 14,
the compositional formula: $Li_{1.5}[Ni_{0.285}Zn_{0.015}Bi_{0.015}Mn_{0.885}[Li]_{0.3}]O_3$ (wherein the compositional formula corresponds to the compositional formula (1) wherein a=0.285, b=(0.015+0.015), c=0.885, d=0.30, a+b+c+d=1.5, a+b+c=1.2, and n, which is the valence of M={divalence (valence of Zn)+pentavalence (Bi the valence of)}÷2=3.5 valence) was used. This positive electrode active material 14 was synthesized in the same manner as Example 1.

A positive electrode C55, and a lithium ion secondary battery 5 of coin cell 2032 type were obtained in the same manner as Example 1 except that 90 weight parts of this positive electrode active material 14 was used.

Comparative Example 1

As a positive electrode active material 15,
the compositional formula: $Li_{1.5}[Ni_{0.3}Mn_{0.9}[Li]_{0.3}]O_3$ (wherein the compositional formula corresponds to the compositional formula (1) wherein a=0.3, b=0, c=0.9, d=0.30, a+b+c+d=1.5, and a+b+c=1.2, not containing a polyvalent, different kind of element (substitution element) M) was used. This positive electrode active material 15 was synthesized in the same manner as Example 1.

A positive electrode C66, and a lithium ion secondary battery 6 of coin cell 2032 type were obtained in the same manner as Example 1 except that 90 weight parts of this positive electrode active material 15 was used.

Comparative Example 2

As a positive electrode active material 16,
the compositional formula: $Li_{1.5}[Ni_{0.285}Zn_{0.03}Mn_{0.885}[Li]_{0.3}]O_3$ (wherein the compositional formula corresponds to the compositional formula (1) wherein a=0.3, b=0.03, c=0.9, d=0.30, a+b+c+d=1.5, a+b+c=1.2, and n, which is the valence of M=divalence (valence of Zn)) was used. This positive electrode active material 16 was synthesized in the same manner as Example 1.

A positive electrode C77, and a lithium ion secondary battery 7 of coin cell 2032 type were obtained in the same manner as Example 1 except that 90 weight parts of this positive electrode active material 16 was used.

[Treatment Process for Obtaining Desired Spinel Structure Change Ratio k]

<1. Electrochemical Pretreatment (Process)>

Using the lithium ion secondary batteries 1 to 7 obtained in Examples 1 to 5 and Comparative Examples 1 to 2, electrochemical pretreatment of performing a charge or a charge-discharge in which the maximum potential in a predetermined electric potential range of the battery is 4.3 V or higher and less than 4.8 V as a conversion to the lithium metal counter electrode, was performed as described below.

The charge was performed with constant current (CC) charge method of charging to 4.2 V of the maximum voltage at 0.1 C rate. Then, resting was performed for about 24 hours. Discharge was performed with constant current (CC) discharge method of discharging to 2.5 V of the minimum voltage of the battery at 0.1 C rate. Next, constant current charge-discharge cycle twice of charging to 4.5 V of the maximum voltage at 0.1 C rate, and then discharging to 2.0 V of the minimum voltage of the battery at 0.1 C rate; constant current charge-discharge cycle once of charging to 4.6 V of the maximum voltage at 0.1 C rate, and then discharging to 2.0 V of the minimum voltage at 0.1 C rate; and constant current charge-discharge cycle once of charging to 4.7 V of the maximum voltage at 0.1 C rate, and then discharging to 2.0 V of the minimum voltage at 0.1 C rate were performed. Any of these operations were performed under room temperature. Conditions for the electrochemical pretreatment (specification) are shown in Table 2 described below.

TABLE 2

| Pattern | State | Voltage (V) Lower limit | Voltage (V) Upper limit | Current rate (C) | Time (h) | Mode | Repetition number (times) |
|---|---|---|---|---|---|---|---|
| 1 | Charge |  | 4.2 | 0.1 |  | CC | 1 |
|  | Rest |  |  |  | 24 |  |  |
|  | Discharge | 2.5 |  | 0.1 |  | CC |  |
| 2 | Charge |  | 4.5 | 0.1 |  | CC | 2 |
|  | Discharge | 2.0 |  | 0.1 |  | CC |  |
| 3 | Charge |  | 4.6 | 0.1 |  | CC | 1 |
|  | Discharge | 2.0 |  | 0.1 |  | CC |  |
| 4 | Charge |  | 4.7 | 0.1 |  | CC | 1 |
|  | Discharge | 2.0 |  | 0.1 |  | CC |  |

<2. Charge and Discharge Treatment (Process) and Evaluation for Initial Property>

Using the lithium ion secondary batteries 1 to 7 having been subjected to the electrochemical pretreatment, the charge-discharge treatment of performing a charge or a charge-discharge at 4.8 V of the maximum potential of the battery in a predetermined electric potential range as a conversion to the lithium metal counter electrode, was performed as described below.

Charge was performed with constant current and constant voltage (CCCV) charge method (for 15 hours for whole charge) of performing charge to 4.8 V of the maximum voltage at 0.1 C rate, and then retaining the current and the voltage for about 1 hour to 1.5 hours, and discharge was performed with constant current discharge method of discharging at 0.1 C rate to 2.0 V of the minimum voltage of the battery. Any of these operations were performed under room temperature. Conditions (specification) for the charge-discharge treatment are shown in Table 3 described below.

TABLE 3

| Pattern | State | Voltage (V) Lower limit | Voltage (V) Upper limit | Current rate (C) | Time (h) | Mode | Repetition number (times) |
|---|---|---|---|---|---|---|---|
| 1 | Charge |  | 4.8 | 0.1 | 15 | CCCV | 1 |
|  | Discharge | 2.0 |  | 0.1 |  | CC |  |

By performing the electrochemical pretreatment and the charge-discharge treatment in this way, it is possible to obtain the value k from the calculation formula of the spinel structure change ratio k defined in this invention in the transition metal oxide containing solid-solution lithium used in the positive electrode active material of the lithium ion secondary batteries 1 to 7 (see FIG. 1B). Namely, in this step, a transition metal oxide containing solid-solution lithium having a desired spinel structure change ratio k is prepared. The value k (structure change amount) obtained from the calculation formula of the spinel structure change ratio k is shown in Table 4 described below.

In addition, as the initial properties evaluation, the initial charge capacity was calculated from the initial (first cycle) charge results by the charge-discharge treatment, and the initial discharge capacity was calculated from the initial (first cycle) discharge results by the charge-discharge treatment. In addition, from the initial charge capacity and the discharge capacity, the initial charge-discharge efficiency was calculated. The obtained results are shown in Tables 4 and 5, and FIGS. 3 to 5 described below.

TABLE 4

|  | Composition | Element substitution kind | Nominal valence | Structure change amount | Capacity (mAh/g) | Initial efficiency (%) |
|---|---|---|---|---|---|---|
| Example 1 | $Li_{1.5}[Ni_{0.285}M_{0.03}Li_{0.3}Mn_{0.885}]O_3$ | $Co_{0.015}V_{0.015}$ | 4.0 | 0.82 | 277.2 | 85.0 |
| Example 2 | $Li_{1.5}[Ni_{0.285}M_{0.03}Li_{0.3}Mn_{0.885}]O_3$ | $Mo_{0.03}$ | 6.0 | 0.81 | 269.6 | 81.0 |
| Example 3 | $Li_{1.5}[Ni_{0.285}M_{0.03}Li_{0.3}Mn_{0.885}]O_3$ | $Mg_{0.015}Mo_{0.015}$ | 4.0 | 0.80 | 257.1 | 78.0 |
| Example 4 | $Li_{1.5}[Ni_{0.285}M_{0.03}Li_{0.3}Mn_{0.885}]O_3$ | $Bi_{0.03}$ | 5.0 | 0.86 | 286.5 | 87.0 |

TABLE 4-continued

| | Composition | Element substitution kind | Nominal valence | Structure change amount | Capacity (mAh/g) | Initial efficiency (%) |
|---|---|---|---|---|---|---|
| Example 5 | $Li_{1.5}[Ni_{0.285}M_{0.03}Li_{0.3}Mn_{0.885}]O_3$ | $Zn_{0.015}Bi_{0.015}$ | 3.5 | 0.79 | 248.2 | 76.0 |
| Comparative Example 1 | $Li_{1.5}[Ni_{0.3}Li_{0.3}Mn_{0.9}]O_3$ | — | — | 0.80 | 252.7 | 73.8 |
| Comparative Example 2 | $Li_{1.5}[Ni_{0.285}M_{0.03}Li_{0.3}Mn_{0.885}]O_3$ | $Zn_{0.03}$ | 2.0 | 0.75 | 217.7 | 66.2 |

In Table 4, the element substitution kind represents M of the compositional formula (1) of the transition metal oxide containing solid-solution lithium. The nominal valence represents the valence of M of the compositional formula (1). The structure change amount represents the value k obtained from the calculation formula of the spinel structure change ratio k. As the capacity, used was initial charge capacity calculated from the initial (first cycle) charge results by the charge-discharge treatment. As the initial efficiency, used was initial charge-discharge efficiency calculated from the initial charge capacity and the discharge capacity by the charge-discharge treatment.

<Experimental Results>

Tables 4 and 5 show the composition of each element substitution material (M of the compositional formula (1)) and the nominal valence of the substitution element (n, which is the valence of M of the compositional formula (1)), the amount of the change of the crystalline structure (value k obtained from the calculation formula of the spinel structure change ratio k) at the time of the initial charge (at the time of the charge of the charge-discharge treatment), the

TABLE 5

| | | | | Theoretical value | | Measured value | | | |
|---|---|---|---|---|---|---|---|---|---|
| | | | | | | | Charge | Total | |
| | Composition | Molecular weight (g/mol) | $Li_2MnO_3$ composition | Total capacity (mAh/g) | Plateau capacity (mAh/g) | Real plateau capacity (mAh/g) | capacity in others than plateau (mAh/g) | charge capacity (mAh/g) | Discharge capacity (mAh/g) | Initial efficiency (%) |
| Example 1 | $Li_{1.5}[Ni_{0.285}M_{0.03}Li_{0.3}Mn_{0.885}]O_3$ | 127.5 | 0.6 | 378.4 | 227.0 | 186.7 | 139.4 | 326.1 | 277.2 | 85.0 |
| Example 2 | $Li_{1.5}[Ni_{0.285}M_{0.03}Li_{0.3}Mn_{0.885}]O_3$ | 128.7 | 0.6 | 374.8 | 224.9 | 181.9 | 150.9 | 332.8 | 269.6 | 81.0 |
| Example 3 | $Li_{1.5}[Ni_{0.285}M_{0.03}Li_{0.3}Mn_{0.885}]O_3$ | 127.6 | 0.6 | 377.9 | 226.8 | 180.6 | 149.0 | 329.6 | 257.1 | 78.0 |
| Example 4 | $Li_{1.5}[Ni_{0.285}M_{0.03}Li_{0.3}Mn_{0.885}]O_3$ | 132.1 | 0.6 | 365.2 | 219.1 | 190.1 | 139.1 | 329.2 | 286.5 | 87.0 |
| Example 5 | $Li_{1.5}[Ni_{0.285}M_{0.03}Li_{0.3}Mn_{0.885}]O_3$ | 130.0 | 0.6 | 371.2 | 222.7 | 176.5 | 150.1 | 326.6 | 248.2 | 76.0 |
| Comparative Example 1 | $Li_{1.5}[Ni_{0.3}Li_{0.3}Mn_{0.9}]O_3$ | 127.5 | 0.6 | 378.2 | 226.9 | 182.1 | 160.3 | 342.4 | 252.7 | 73.8 |
| Comparative Example 2 | $Li_{1.5}[Ni_{0.285}M_{0.03}Li_{0.3}Mn_{0.885}]O_3$ | 127.8 | 0.6 | 377.5 | 226.5 | 169.2 | 159.6 | 328.8 | 217.7 | 66.2 |

In Table 5, the molecular weight represents the molecular weight of the transition metal oxide containing solid-solution lithium. The $Li_2MnO_3$ composition represents the ratio of $Li_2MnO_3$ (layered structure site) taken up in the transition metal oxide containing solid-solution lithium. The total capacity of the theoretical value represents chargeable theoretical capacity. The plateau capacity of the theoretical value represents theoretical capacity calculated from the composition of $Li_2MnO_3$. The real plateau capacity of the measured value represents the capacity of the range of B in the figure shown in FIG. 1B, and was calculated by summing the plateau capacities occurring near 4.5 V in each charge-discharge step of the electrochemical pretreatment and the charge-discharge treatment. The charge capacity in others than plateau of the measured value represents the capacity of the range of A in the figure shown in FIG. 1B, and was calculated as the charge capacity at the time of 4.2 V maximum voltage of the electrochemical pretreatment. As the total charge capacity of the measured value, used was initial charge capacity calculated from the initial (first cycle) charge results of the charge-discharge treatment. As the discharge capacity of the measured value, used was initial discharge capacity calculated from the initial (first cycle) discharge results by the charge-discharge treatment. As the discharge capacity, and the charge-discharge efficiency. It was shown that the charge-discharge efficiency improves as the nominal valence n of the substitution element M or the structure change amount k increases, as shown in FIG. 3 or Tables 4 and 5. Further, it was shown from Table 4 or FIGS. 4 and 5 that the discharge capacity retains relatively high value when the nominal valence n is 3 or more (preferably 4 or more) and the structure change amount k is 0.76 or more, and is improved as the nominal valence n or the structure change amount k increases. From this, it was possible to achieve both high capacity and high efficiency by the polyvalent, different kind of element substitution having 3 or higher valence and the structure change amount.

[Evaluation for Load Current Property]

Using the lithium ion secondary batteries 1 to 7 performed with the electrochemical pretreatment and the charge-discharge treatment, a charge-discharge was performed at the conditions described below, and the load current property was evaluated.

Charge was performed with constant current and constant voltage (CCCV) charge method (for 15 hours for whole charge) of charging to 4.8 V of the maximum voltage at 0.1 C rate, and then retaining for about 1 hour to 1.5 hours, and discharge was performed with constant current (CC) discharge method of discharging to 2.0 V of the minimum voltage of the battery at 0.1 C rate. Any of these operations were performed under room temperature.

Then, charge-discharge was performed with similar constant current and constant voltage (CCCV) charge method and constant current (CC) discharge method at 0.5 C, 1.0 C and 2.5 C rate, and evaluation for load current property was performed. The conditions (specification) for these load current properties are shown in Table 6 described below. In addition, as for the load current property, the capacity retention rate was calculated from the ratio of each discharge capacity at 0.5 C, 1.0 C and 2.5 C rate relative to the discharge capacity at 0.1 C rate by the formula described below. The obtained results are shown in Table 7 described below.

0.5 C (or 1.0 C or 2.5 C) capacity retention rate (%)=Discharge capacity (mAH/g) at 0.5 C (or 1.0 C or 2.5 C)/Discharge capacity (mAH/g) at 0.1 C×100     [Mathematical Formula 3]

TABLE 6

| Pattern | State | Voltage (V) Lower limit | Voltage (V) Upper limit | Current rate (C) | Time (h) | Mode | Repetition number (times) |
|---|---|---|---|---|---|---|---|
| 1 | Charge |  | 4.8 | 0.1 | 15 | CCCV | 1 |
|  | Discharge | 2.0 |  | 0.1 |  | CC |  |
| 2 | Charge |  | 4.8 | 0.5 | 15 | CCCV | 1 |
|  | Discharge | 2.0 |  | 0.5 |  | CC |  |
| 3 | Charge |  | 4.8 | 1.0 | 15 | CCCV | 1 |
|  | Discharge | 2.0 |  | 1.0 |  | CC |  |
| 4 | Charge |  | 4.8 | 2.5 | 15 | CCCV | 1 |
|  | Discharge | 2.0 |  | 2.5 |  | CC |  |

[Evaluation for Capacity of Battery]

Using the lithium ion secondary batteries 1 to 7 performed with the electrochemical pretreatment and the charge-discharge treatment, the charge-discharge at 0.1 C rate described below was repeated by 50 cycles at room temperature. The ratio of the 50th cycle's discharge capacity relative to the first cycle's discharge capacity was assumed to the capacity retention rate (%) after 50 cycles. The obtained results are shown in Table 7.

As the conditions of the charge-discharge cycle, charge was performed with constant current and constant voltage (CCCV) charge method of charging to 4.5 V of the maximum voltage at 0.1 C rate, and then retaining for about 1 hour to 1.5 hours, and discharge was performed with constant current (CC) discharge method of discharging to 2.0 V of the minimum voltage of the battery at 0.1 C rate. Any of these operations were performed under room temperature.

<Experimental Results>

Table 7 shows the composition of each element substitution material (M of the compositional formula (1)) and the nominal valence of the substitution element (n, which is the valence of M of the compositional formula (1)), the amount of the change of the crystalline structure (value k obtained from the calculation formula of the spinel structure change ratio k) at the time of the initial charge (at the time of the charge of the charge-discharge treatment), and the capacity retention rate after 50 cycles, and the capacity retention rate at 0.5 C, 1 C and 2.5 C. It was shown that the capacity retention rate improves as the nominal valence n of the substitution element M or the structure change amount k increases, as shown in Table 7. From this point and the results of Tables 4 and 5 above and FIGS. 3 to 5, it was possible to realize high capacity and high efficiency and high capacity retention rate by the polyvalent, different kind of element substitution having 3 or higher valence and the structure change amount.

Meanwhile, with respect to a transition metal oxide containing solid-solution lithium extracted from the disassembled lithium ion secondary battery of each examples, it was confirmed that the transition metal oxide containing solid-solution lithium has the layered structure site and the spinel structure site by presence of peaks special for the layered structure and the spinel structure by X ray diffraction analysis (XRD).

Although this invention has been described with some embodiments and Examples above, this invention is not limited thereto, and can be modified in a various way within the gist of the present invention.

Specifically, a laminate type battery and a coin type battery are exemplified as a lithium ion secondary battery in the embodiments and Examples. However, the lithium ion secondary is not limited thereto, and a conventional, known

TABLE 7

| | Composition | Element substitution kind | Nominal valence | Structure change amount | Capacity retention rate (%) after 50 cycles | Capacity retention rate (%) 0.5 C | Capacity retention rate (%) 1.0 C | Capacity retention rate (%) 2.5 C |
|---|---|---|---|---|---|---|---|---|
| Example 1 | $Li_{1.5}[Ni_{0.285}M_{0.03}Li_{0.3}Mn_{0.885}]O_3$ | $Co_{0.015}V_{0.015}$ | 4.0 | 0.82 | 90.2 | 93.4 | 85.6 | 67.9 |
| Example 2 | $Li_{1.5}[Ni_{0.285}M_{0.03}Li_{0.3}Mn_{0.885}]O_3$ | $Mo_{0.03}$ | 6.0 | 0.81 | 91.3 | 93.7 | 85.8 | 68.3 |
| Example 3 | $Li_{1.5}[Ni_{0.285}M_{0.03}Li_{0.3}Mn_{0.885}]O_3$ | $Mg_{0.015}Mo_{0.015}$ | 4.0 | 0.80 | 92.6 | 95.1 | 82.1 | 66.5 |
| Example 4 | $Li_{1.5}[Ni_{0.285}M_{0.03}Li_{0.3}Mn_{0.885}]O_3$ | $Bi_{0.03}$ | 5.0 | 0.86 | 89.0 | 91.1 | 81.7 | 65.2 |
| Example 5 | $Li_{1.5}[Ni_{0.285}M_{0.03}Li_{0.3}Mn_{0.885}]O_3$ | $Zn_{0.015}Bi_{0.015}$ | 3.5 | 0.79 | 90.4 | 94.9 | 86.4 | 69.0 |
| Comparative Example 1 | $Li_{1.5}[Ni_{0.3}Li_{0.3}Mn_{0.9}]O_3$ | — | — | 0.80 | 90.1 | 92.4 | 85.2 | 68.1 |
| Comparative Example 2 | $Li_{1.5}[Ni_{0.285}M_{0.03}Li_{0.3}Mn_{0.885}]O_3$ | $Zn_{0.03}$ | 2.0 | 0.75 | 85.8 | 90.1 | 83.7 | 67.0 | form or structure, for example, a button type battery, a can type battery such as a rectangle type and a cylinder type, and the like can be applied.

In addition, for example, in this invention, not only the stack type (flat type) battery described above, but also a conventional, known form or structure, for example, a winding type (cylinder type) battery and the like can be applied.

Further, in this invention, not only the plain type (internal parallel connection type) battery described above, but also a conventional, known form or structure such as a bipolar type (internal serial connection type) battery can be applied, with respect to electrical connection type (electrode structure) in the lithium ion secondary battery. Meanwhile, a battery element in a bipolar type battery generally has the constitution in which a bipolar type electrode where a negative electrode active material layer is formed on one surface of a current collector, and a positive electrode active material layer is formed on the other surface, and an electrolyte layer are stacked in multiple layers.

The invention claimed is:

1. A method for producing a non-aqueous electrolyte secondary battery using a transition metal oxide containing solid-solution lithium as a positive electrode, wherein the transition metal oxide containing solid-solution lithium is represented by the compositional formula (1):

$$Li_{1.5}[Ni_aM_bMn_c[Li]_d]O_3 \qquad (1)$$

wherein Li represents lithium, Ni represents nickel, M represents at least one kind of element selected from the group consisting of silicon, phosphorus and metal elements (but excluding Ni, Mn and Li), Mn represents manganese, O represents oxygen, a, b, c and d satisfy the relationships of $0<a<1.4$, $0<b\leq0.2$, $0<c<1.4$, $0.1<d\leq0.4$, $a+b+c+d=1.5$ and $1.1\leq[a+b+c]<1.4$, and n, which is the valence of M, is in a range of $3.5\leq n\leq 6$ (when M consists of two or more elements, n is the average value of the valence of each element), wherein the transition metal oxide containing solid-solution lithium has a layered structure site and a site which changes to a spinel structure, the method comprising:

electrochemically pretreating the transition metal oxide by preforming a first charge-discharge in which a maximum potential of the battery in a predetermined electric potential range is 4.3 V or higher and less than 4.8 V, wherein the electrochemically pretreating further comprises resting between a charge and a discharge for a predetermined time that is not less than ten minutes; and charge-discharge treating by performing a second charge-discharge in which the maximum potential of the battery in the predetermined electric potential range is 4.8 V to convert to a lithium metal counter electrode, the electrochemically pretreating and the charge-discharge treating resulting in the layered structure site and the spinel structure site, whereby a spinel structure change ratio k of the transition metal oxide containing solid-solution lithium is in a range of $0.25\leq k<1.0$ when the spinel structure change ratio is assumed to be 1 in a case where $Li_2MnO_3$ of the layered structure in the transition metal oxide containing solid-solution lithium completely changes to $LiMn_2O_4$ of the spinel structure.

2. The method according to claim 1, wherein the n, which is the valence of M, is in a range of $4\leq n\leq 6$, and the spinel structure change ratio k is in a range of $0.5\leq k\leq 0.9$.

3. The method according to claim 2, wherein the n, which is the valence of M, is in a range of $4\leq n\leq 5$, and the spinel structure change ratio k is in a range of $0.6\leq k\leq 0.9$.

4. The method according to claim 1, wherein the first charge-discharge is repeatedly performed at the maximum potential.

5. The method according to claim 1, wherein both a charge and a discharge during electrochemically pretreating are performed in a range of 0.01 to 0.5 C in a constant current charge-discharge mode.

6. The method according to claim 1, wherein the charge-discharge treating is performed in a constant current and constant voltage charge-constant current discharge mode.

* * * * *